(12) United States Patent
Lundy

(10) Patent No.: US 9,911,297 B2
(45) Date of Patent: *Mar. 6, 2018

(54) THREAT DETECTION SYSTEM HAVING MULTI-HOP, WIFI OR CELLULAR NETWORK ARRANGEMENT OF WIRELESS DETECTORS, SENSORS AND SUB-SENSORS THAT REPORT DATA AND LOCATION NON-COMPLIANCE, AND ENABLE RELATED DEVICES WHILE BLANKETING A VENUE

(71) Applicant: Douglas Lundy, Burlington (CA)

(72) Inventor: Douglas Lundy, Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/205,148

(22) Filed: Jul. 8, 2016

(65) Prior Publication Data

US 2016/0358444 A1 Dec. 8, 2016

Related U.S. Application Data

(63) Continuation of application No. 14/616,642, filed on Feb. 6, 2015, now Pat. No. 9,390,608, which is a continuation of application No. 13/902,478, filed on May 24, 2013, now Pat. No. 8,994,556.

(60) Provisional application No. 61/651,231, filed on May 24, 2012.

(51) Int. Cl.
*G08B 21/00* (2006.01)
*G08B 21/02* (2006.01)
*G08C 17/02* (2006.01)
*G08B 25/00* (2006.01)
*H04W 84/18* (2009.01)

(52) U.S. Cl.
CPC ........... *G08B 21/02* (2013.01); *G08B 25/009* (2013.01); *G08C 17/02* (2013.01); *H04W 84/18* (2013.01)

(58) Field of Classification Search
CPC ............................. G08B 25/009; G08C 17/02
See application file for complete search history.

(56) References Cited

U.S. PATENT DOCUMENTS

| | | | | |
|---|---|---|---|---|
| 5,959,568 A | * | 9/1999 | Woolley | G01S 5/0289 235/385 |
| 2007/0093970 A1 | * | 4/2007 | Padmanabhan | G08B 21/12 702/23 |
| 2007/0222585 A1 | * | 9/2007 | Sabol | G06Q 10/06 340/539.11 |

* cited by examiner

*Primary Examiner* — Mark Rushing

(57) ABSTRACT

A data sensing and threat detection network comprising a plurality of wireless sensor devices and their related wireless sub-sensor devices, for communication with wireless detector units/gateways in a network arrangement to allow transmission of data there between in optimized paths, such wireless detector units to communicate, by secure means, to and from a Central Monitoring Unit that manages the sensing and alert process, based upon wireless sensor and wireless sub-sensor values and location data, data "rate of change", and the like, and enables related devices, as and when required.

20 Claims, 3 Drawing Sheets

THREAT DETECTION SYSTEM HAVING MULTI-HOP, WIFI OR CELLULAR NETWORK ARRANGEMENT OF WIRELESS DETECTORS, SENSORS AND SUB-SENSORS THAT REPORT DATA AND LOCATION NON-COMPLIANCE, AND ENABLE RELATED DEVICES WHILE BLANKETING A VENUE

This is a continuation of U.S. patent application Ser. No. 14/616,642, filed Feb. 6, 2015, U.S. patent application Ser. No. 13/902,478, filed May 24, 2013, and priority of U.S. provisional application 61/651,231, filed May 24, 2012, is hereby claimed. The disclosures of all of the above applications are hereby incorporated herein by reference.

The present invention relates generally to environmental data sensing systems. More particularly, the present invention relates to a system utilizing sensor devices for detecting and reporting environmental threats such as, but not limited to, chemical, biological, radiological, nuclear and explosives (CBRNE), hazardous material and volatile organic compounds (HAZMAT/VOCs), toxin/disease and critical conditions, and others that, for example, diminish the quality of life, so that appropriate action can be taken. Such sensor devices may be referred to herein as "critical condition" sensor devices. More generally, the term "threat" is meant to refer to the exceeding, on the lower and/or upper side, a desired sensed value range. For example, in an industrial process, it may be desired that a temperature not climb over 100 degrees F. (upper side) nor go below 30 degrees F. (lower side), and exceeding (going above on the upper side or going below on the lower side) the respective predetermined temperature would be considered a threat.

The events of Sep. 11, 2001, pointed to the need to reliably and quickly detect multiple threats (chemical, biological, nuclear, etc.) in the field so that they could be countered quickly. A need for such a system still exits and is thus a long-felt need.

The present invention relates to an integrated system and method for the closed-loop collection of data and analysis to detect one or more environmental threats, such as, but not limited to, chemical, biological, radiological-nuclear and explosives ("CBRNE"), and/or hazardous material and volatile organic compounds ("HAZMAT/VOCs"), and/or food, air and water contamination and disease ("Toxins/disease"), and/or unexpected events such as excessive water and/or other liquid escape or consumption, water and/or other liquid level and/or flow detection, motion detection, open/closed detection, GPS-based location, cellular triangulation-based location, schedule adherence, humidity and temperature and light level and barometric pressure (based upon upper and lower thresholds), impact and/or inertia and vibration ("Critical Conditions") and various other environmental threats in containers, enclosures, container ships, seaports, aircraft, airports, transit systems, air/food and water supply chains, walk-in and reach-in coolers, freezers, cooking and warming ovens, oceans/ponds and lakes, building resource utilization and military warfare, offices, restaurants, factories, assembly plants, homes and various other venues, hereinafter collectively referred to as "Venue" or "Venues."

DESCRIPTION OF THE PRIOR ART

U.S. Pat. No. 7,031,663 discloses a system using sensors for performing environmental measurements (such as temperature, humidity, etc.) and for transferring the results over a cellular radio system to central equipment as well as to cellular customers. The sensors are physically connected to base stations of a cellular radio system. The measuring stations are equipped for giving an alarm if any of the measured results exceed a certain alarm limit or if a serious malfunction occurs in the function of the measuring station (sensor). Individual alarm limits can be set and changed using commands from central equipment. U.S. Pat. No. 7,081,816 discloses a compact wireless sensor, and U.S. Pat. No. 7,218,094 discloses a wireless test system. Also see U.S. published applications 2004/0038385 and 2006/0057599 and European published patent document EP 622625. These and all other patents and published applications referred to herein are incorporated herein by reference.

In a wireless network which consists of multi-hop, WiFi or cellular network arrangements, multiple sensor devices are deployed wherein information is ultimately transmitted to detector units or gateways. A single transmission of information from one such device to another may be called a "hop." If there is transmission of information from one such device to another which then re-transmits the information to another device (in two or more hops) before it is finally transmitted to a detector unit, it may then be said that the transmission is in two hops. This may be done, as considered optimal for the network, for effecting wireless transmission over further distances to a detector unit than if each device transmission had to be directly to a detector unit. In such networks, some transmissions of information to a detector unit may be single hop transmissions and others may be multi-hop transmissions. However, even if all transmissions to detector units are one-hop transmissions, it is still considered to be a multi-hop network, as long as the network has the ability to organize the devices to transmit data to the detector units using an optimized path, which can include any number of hops including one hop. A ZigBee-type wireless multi-hop network is disclosed in U.S. published application 2011/0063999. A wireless sensor network with multi-hop routing connectivity is disclosed in U.S. Pat. No. 7,830,838. Other examples of such networks are found in U.S. Pat. Nos. 7,224,642; 7,831,283; 8,023,501; 8,102,787; 8,134,942; 8,138,934; 8,140,143; 8,160,600, and U.S. published applications 2010/0094583 and 2010/0235504, all of which patents and published applications referred to above and elsewhere in this application being incorporated herein by reference. While sensor devices in such a network may be adapted for such re-transmission of information, other devices such as routers may alternatively be incorporated in the network and adapted for such re-transmission of information. By multi-hop, as used herein and in the claims, is meant a wireless network system comprising devices for transmitting and receiving data and detector units for receiving and transmitting the data, wherein the system has the capability to organize the transmission of the data from each device to its detector unit, either in a single hop wherein the data is transmitted directly to the respective detector unit or in multiple hops wherein the data is transmitted to the respective detector unit via one or more intermediary devices which re-transmit the data. The devices may, but not necessarily, include sensor devices for providing and transmitting or re-transmitting sensed information and may, but not necessarily, include devices such as routers or other devices for re-transmission of the data, which re-transmission would result in multiple hops of the data to the respective detector unit. The detector units may of course re-transmit the received data in accordance with the requirements of the system, such as immediately to a central monitoring unit. Thus, the network is self-organized among the sensor devices, any non-sensor re-transmission devices, and detector units, thereby to eliminate single points of failure in the wireless network/system and to allow transmission of sensed data over greater distances to a detector unit than if there was no such capability for re-transmission of the information. The detector units transmit the information wirelessly to the remote central monitoring unit through means such as cellular networks, WiFi networks, satellite networks, and/or by secure ethernet wire connection to the internet or a local intranet connection.

The multi-hop, WiFi or cellular networks may be considered to be an improvement over and is distinguished from what might be called a "hub and spoke" network in which a plurality of sensor devices must each communicate directly with a particular detector unit which in turn must communicate such as with a central monitoring unit. As a result, a hub and spoke network does not have multi-hop capability thus requiring towers to be built for expensive wireless repeaters. Also, significant alternating current, with large battery back-up, is required to boost the signal strength. As a result, many potential points of failure are undesirably created. For example, a system utilizing wireless sensors marketed by Monnit Corporation of Midvale, Utah (www.monnit.com) utilizes a hub and spoke network.

Threat detection systems have typically relied on alarm thresholds that are published and/or utilized by others to determine the environmental threat value at which a sensor will initiate an alarm, with the result that the sensors initiate alarms so very frequently that they may be considered an annoyance and disregarded (turned off) by those such as military units or manufacturing managers in charge of them.

U.S. Pat. No. 7,412,356 discloses the detection of real events such as pathogens or radiation, a stated object being to virtually eliminate false positives. This is done by obtaining a set of recent signal results, calculating measures of the noise or variation based thereon, calculating an expected baseline value based thereon, determining sample deviation, calculating an allowable deviation by multiplying the sample deviation by a threshold factor, and setting an alarm threshold from the baseline value plus or minus the allowable deviation. The system during operation determines whether the signal results exceed the alarm threshold. The detection algorithm has two stages that cycle with every new sample update. The first is to estimate the new value of the baseline, and the second is to determine if the new sample is indeed positive [col. 5, lines 17 to 20]. The recent historical data is analyzed by a form of regression to generate an expected value for the next data point. The historical data is also analyzed to determine a standard deviation from noise, and a multiple of this standard deviation is added to the expected value to determine the threshold. This is said to allow the thresholds to tighten when there is a low level of noise, giving the best possible sensitivity, and then expand when the signals become noisy, maintaining a low probability of false positive [col. 13, lines 21 to 32].

U.S. Pat. Nos. 7,088,230 and 7,362,223 disclose detection systems for chemical, biological, and nuclear weapons wherein alarm thresholds are based on the likelihood of attack during certain environmental conditions such as whether it is raining or not. Wireless telemetry is used [col. 3, line 55, '223 patent]. See also published applications 2004/0038385 and 2006/0057599 relative to systems for autonomous monitoring of bio-agents.

Other patents which may be of interest to alarm thresholds include U.S. Pat. Nos. 3,634,839; 4,490,831; 4,514,720; 4,785,283; 5,172,096; 5,471,194; 5,845,237; 6,704,691; 6,956,473; 6,989,742; 7,030,746; 7,249,287; 7,250,855; 7,363,168; 7,437,249; and 7,733,220.

U.S. Pat. No. 7,366,624 discloses a sensor signal conditioner for a plug-in module comprising a gas sensor and sensor specification information (TEOS) stored in digital form therewith. It is said that the conditioner can automatically adapt to a wide variety of commercial off-the-shelf sensors and provide a digital output in a standard easily used format [Abstract and col. 1, lines 25 to 33]. The conditioner has an analog section which controls the module, and a digital section comprising a microcontroller which controls the analog section and provides a readable digital output. It is stated that there are microelectromechanical systems (MEMS) which promise much smaller size, lower power, and lower cost than conventional gas sensors, and that many are under development but few are commercially available [col. 5, lines 59 to 67].

U.S. Pat. No. 5,918,194 discloses an integrated modular measurement system which includes a universal module which receives measurement data from one or more measurement sensors, converts the data to a value that represents the characteristic being measured, and indicates the value to a user. An input module is coupled to the universal module and houses one or more measurement sensors (with optional multiplexing) and contains memory, including calibration information, associated with and local to the sensors. A sensor is calibrated prior to its use, i.e., the sensor measures the appropriate characteristic over an appropriate range, wherein each value in the range is known, and the measured characteristic is then compared against the known characteristic across that range and calibration constants are thereby calculated and downloaded into memory associated with that particular sensor for subsequent use [col. 9, lines 49 to 59]. Other modular sensor systems are disclosed in U.S. Pat. Nos. 5,340,543; 5,808,179; 6,029,499; 7,366,624; and 7,506,533, all of which are incorporated herein by reference.

OBJECTS OF THE INVENTION

It is an object of the present invention to provide a more reliable threat detection system.

It is another object of the present invention to more reliably eliminate false positives from such a system without introducing false negatives.

It is another object of the present invention to more reliably determine when a wireless detector, wireless sensor or wireless sub-sensor has been moved, without authorization.

It is another object of the present invention to more reliably detect "rate of change" of sensed values, such that early non-compliance conditions can be detected.

It is another object of the present invention to detect sensed values that require the enabling of another device, and cause that enabling event to occur.

It is yet another object of the present invention to inexpensively provide such a reliable system for the mass market.

It is another object of the present invention to quickly provide real-time qualified alerts to system users when sensed values are non-compliant with normal threshold ranges or when there are non-compliant conditions such as a door open (when it should be closed) or motion (when it should be still), or detector units (gateways/coordinators) or sensor devices do not respond when scheduled, due to sabotage or failure or for some other reason. With respect to non-compliance of sensed values with threshold ranges, a qualified alert, illustrated at 214, is one which is declared after subjection of data to the process hereinafter described with respect to FIGS. 2 and 3, including one which may also be declared after the sensing of such a condition as described above.

Single purpose sensor devices for compounds such as sarin and the like or other sensor devices may not remain accurate as temperature, humidity, barometric pressure, and the like increase or decrease over time unless otherwise suitably adjusted therefor. It is accordingly another object of the present invention to provide group sensor devices with the ability to sense directly related data (data such as temperature, humidity, barometric pressure, and the like that have a direct bearing on the sensed value of a critical condition such as presence of a chemical compound or radiation being sensed) and to utilize this sensed directly related data to adjust the sensed value of the critical condition, so as to provide an adjusted sensed value of the critical condition which is more accurate than the unadjusted sensed value. For example, as humidity increases, it is an object of the present invention to adjust the sensed concentration value of a chemical compound therefor. Also, a group sensor may include a configuration such as a door condition sensor and motion sensor in conjunction with a video capture subsystem.

The above and other objects, features, and advantages of the present invention will be apparent in the following detailed description of the preferred embodiment(s) when read in conjunction with the appended drawings wherein the same reference numerals denote the same or similar parts throughout the several views.

DETAILED DESCRIPTION OF THE PREFERRED EMBODIMENT(S)

Figure 1:
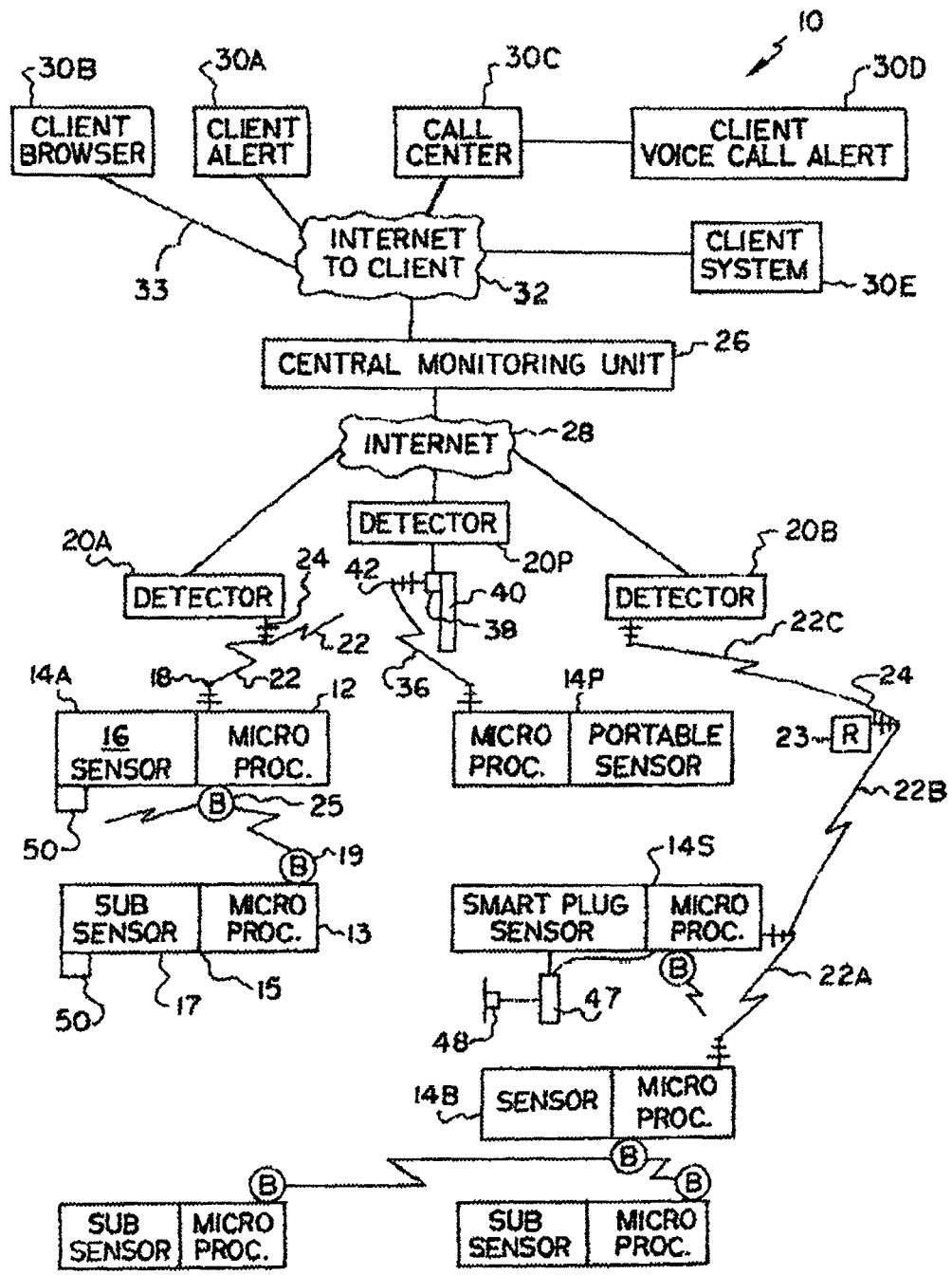
FIG. 1 is a schematic view of a system for declaring an alert which embodies the present invention.

Referring to FIG. 1, there is shown generally at 10 a system for detecting and responding to environmental threats, such as chemical, biological, radiological-nuclear and explosives (CBRNE) and critical conditions and various other threats which can be detected with sensor technology. The system 10 includes a plurality (perhaps hundreds) of sensor devices, illustrated at 14, placed in selected environmental locations where the respective threat may occur. For example, the sensor devices 14 may be fastened near the ceilings along the walls of an airport corridor or on the runway or in the airport parking lot or at various points within a city, etc. Their locations are selected preferably so that they may not be easily observed or removed by members of the public and to the extent possible may be at locations not accessible to the public, and in many situations will be camouflaged to conceal their presence. The sensor devices 14 in a particular area may all be for sensing a particular environmental condition or may sense a variety of environmental conditions as considered appropriate. The sensor devices may be portable sensor devices, illustrated at 14P and described hereinafter, or may contain smart plugs, illustrated at 14S and described hereinafter, or may be another specially adapted sensor device.

Information as to environmental threats or other information to be sensed which is collected by the sensor devices 14 is transmitted to detector units 20, which may also be called herein and in the claims detectors or detector devices or coordinators or gateways, which provide information to the sensor devices 14 for control thereof and which process and provide the processed information to a central monitoring unit 26, which is a remote or local central real-time monitoring, database, reporting, and management system. The central monitoring unit 26 sends information to the detector units 20 over the internet, as illustrated at 28, or local intranet, for control thereof and processes the information received from the detector units 20 and communicates with the client 30 via the internet, as illustrated at 32. A reference herein and in the claims to the internet is meant to also include, if appropriate, local intranet.

The central monitoring unit 26 and detector units (gateways) 20 may communicate using a suitable communications technology 28 such as, but not limited to, ethernet broadband, WiFi, cellular, satellite, or USB drive. While many detector units 20 may be located at a given Venue such as on a container ship, an intermediary base station communication multiplexer (not shown) may optionally be utilized to concentrate the wireless communications between the detector units 20 and the central monitoring unit 26.

The clients may use client browser functionality, illustrated at 30B, to communicate to and from the central monitoring unit 26 over an SSL (secure internet connection) 33. Also, Client browser 30B functionality may be used from anywhere in the world with internet access, through any computer system with internet connectivity, using a secure SSL connection 33 to obtain sensor device and detector unit (gateway) status information, review sensor device data, and make changes to threshold or condition parameters or update sensor alert notification priorities for specific or all sensor devices 14 or specific or all detector units 20, as more specifically described hereinafter. Each sensor device 14 comprises the sensor (or sensors) 16 for the selected environmental condition (or conditions) and a suitable digital microprocessor 12, including memory and input/output means, for processing the information sensed by the sensor 16. Similarly, as discussed hereinafter, each sub-sensor device 15 comprises a sub-sensor 17 for the selected environmental condition and a suitable digital microprocessor 13, including memory and input/output means, for processing the information sensed by the sub-sensor 17. Unless inappropriate from the context or inconsistent with the remainder of this specification or unless stated otherwise herein, a discussion of the sensor devices 14 and their components will also apply to the sub-sensor devices 15 and their components, and a discussion of the purpose of the sub-sensor devices 15 will be presented hereinafter. In the claims, the terms "sensing devices" or "sensing units" will refer generically to sensor devices 14 and/or sub-sensor devices 15, and therefore a recitation to sensing devices in the claims is not meant to require that any of the sensing devices be sub-sensor devices and is also not meant to require that any of the sensing devices be sensor devices. The microprocessor 12 desirably has non-volatile flash memory and random access memory and a wireless module, including a radio frequency transceiver, as appropriate. A suitable antenna 18 is suitably connected to a respective microprocessor 12 and a suitable antenna 24 is suitably connected to a respective detector 20A for wirelessly relaying the processed information (desirably encrypted) to the respective detector 20A, as illustrated at 22.

Communication between the sensor devices 14 and their respective detectors 20 may, for example, be via the previously discussed and defined multi-hop wireless network, the network being self-organized to provide transmissions to the detector devices over optimized pathways, i.e., an individual sensor device such as 14A may be programmed to transmit and receive information to and from detector 20A or it may be programmed to transmit and receive information to and from another detector such as 20B, thereby to allow flexibility in deployment and flexibility in use of the sensor devices such as allowing a sensor device to transmit and receive information to and from a different detector if the detector to which it is communicating becomes inoperative or if the sensor device is required to be deployed on another detector. In addition, signals to and from a detector 20, such as detector 20B, may be routed from one sensor device such as 14B to another sensor device such as 14S, as illustrated at 22A, to then be re-routed or re-transmitted by the microprocessor 12 of sensor device 14S to the detector 20B via an optional router 23 having a microprocessor, including memory and input/output means, and an antenna 24, in accordance with principles commonly known to those of ordinary skill in the art to which the present invention pertains. Thus, the transmittal of information from the sensor device 14B is shown to require 3 transmittals or hops 22A, 22B, and 22C (i.e., multi-hop), it being understood that a sensor device may be used instead of the router 23, and hereafter a reference to the re-transmittal of information by a sensor device is meant to include a re-transmittal of the information by an optional router, unless otherwise specified. For transmittal of information from the detector 20B to the sensor device 14B, it is understood that the same pathway in reverse 22C, 22B, 22A may be used. The sensor devices 14 and any routers 23, including any associated sub-sensor devices 15 (discussed hereinafter) are desirably closely-spaced in a venue to provide a redundancy so that the failure of any one sensor device 14 or router 23 or sub-sensor device 15 within the venue will have a minuscule or non-impact on the sensing integrity and continuity within the venue. The ability to transfer a sensor device 14 or router 23 between detectors 20 as well as the ability of sensor devices 14 or routers 23 to relay signals from more distant sensor devices 14 or routers 23 (such as the relaying of a signal from sensor device 14B to detector 20B via sensor device 14S and/or router 23, as discussed more fully hereinafter) advantageously allows a flexibility in organizing and use of the network, thereby to facilitate wireless coverage of a physical space.

Each detector 20 suitably has a microprocessor with non-volatile flash memory and volatile random access memory and a wireless module, including a radio frequency transceiver, for communication with the sensor devices 14, and suitably includes a WiFi and/or cellular wireless transceiver and/or an ethernet broadband transceiver and/or satellite transceiver or other suitable equipment for communication with the central monitoring unit 26. Each detector 20 is also suitably programmed, in accordance with principles of common knowledge to those of ordinary skill in the art to which the present invention pertains, to transmit information (desirably encrypted) to sensor devices 14 for control thereof, for example, to program or re-program them, including setting or resetting particular sensor alert condition thresholds and/or sensor alert threshold and/or expanded threshold values, as discussed in greater detail hereinafter. Thus, a sensor device 14 may be easily and quickly replaced by a sensor device for the same threat, by assigning to it the same PAN ID (or other suitable identifier) as the PAN ID (or identifier) of the sensor device being replaced, thus ensuring that it operates on the correct wireless frequency. A particular sensor device 14 may thus be transferred between detectors 20 to send processed information thereto and to receive information therefrom, in accordance with the needs of the network and user's needs, and such can be designed by one of ordinary skill in the art to which the present invention pertains and programmed by a programmer of ordinary skill.

Each detector 20 is preferably kept in a secure location such as, for example, in a secured cabinet so as to be free from public interference or tampering. Each detector 20 and sensor device 14 may be suitably equipped and programmed, in accordance with principles of common knowledge to those of ordinary skill in the art to which the present invention pertains, to detect that a sensor device 14 has been removed without authorization or otherwise tampered with. A sensor device 14 may, for example, be up to several miles from its associated detector 20, due to the flexibility offered by wireless mesh multi-hop data transmission wherein information may be relayed from one sensor device to another, such as from sensor device 14B to sensor device 14S, before it is relayed to detector 20B. For another example, information may be relayed from sub-sensor device 15 to sensor device 14A, before it is relayed to detector 20A. The sensor devices 14 and sub-sensor devices 15 are thus easily and conveniently connected and disconnected as needed, using the client browser 30B, to other sensor devices 14 or detectors 20 for sensing the same or generally similar condition to meet the requirements of the system 10, such as if a detector 20 or sensor device 14 becomes inoperative or if client needs necessitate the transfer of sensor devices 14 and their sub-sensor devices 15 between detectors 20.

The detectors 20 may be electrically powered, and have battery backup power, or otherwise suitably powered, and sensor devices 14 and sub-sensor devices 15 may utilize long-life rechargeable and/or replaceable long-life batteries (for several years) or other suitable power sources, such as micro wind turbines, solar panels, vibration, and radio frequency energy harvesting, and are preferably built, in accordance with principles of common knowledge to those of ordinary skill in the art to which the present invention pertains, to withstand and reliably operate in the wide temperature and humidity ranges and harsh environments and may have shock mounting of electronic components and be configured to interface with and receive unique venue information.

High quality radiation and gas chromatograph (GC) sensor devices may cost in the range of as much as $75,000 to $125,000 or more (and are generally the size of a tabletop), while other lower quality radiation and gas chromatograph (GC) sensors may cost on the order of $17,500 to $25,000 (and are large mobile devices). Such inexpensive lower quality sensor devices may be equipped and programmed to transmit minimal information such as cellular triangulation (GPS) and only readings over a certain threshold and are not equipped for transmitting information directly to and receiving information directly from a detector 20. In order to maintain reliability of the network as well as to blanket an area to therefore provide the desired adequate redundancy for effective monitoring of a site, the high cost of the high quality tabletop sensor devices may make the system overly expensive. Therefore, in accordance with the present invention, in order to provide both the desired quality and redundancy inexpensively, a large number of inexpensive sub-sensor devices 15, suitably battery powered, are provided for communication with an individual sensor device 14 for an area for sending minimal information thereto and receiving minimal information therefrom. Both the sensor devices 14 and their associated sub-sensor devices 15 may be, for example, MEMS-based or NEMS-based (micro-electro-mechanical system-based or nano-electro-mechanical system-based respectively). For the purposes of this specification and the claims, a sub-sensor device is defined as one which is equipped to transmit information to and receive information from a sensor device and is not equipped to directly (i.e., without re-transmission by another device) transmit information to and receive information from a detector.

In order to further reduce cost without sacrificing quality, the communication of data, preferably in encrypted form, between a sub-sensor device 15 and its nearby sensor device 14 is preferably provided by a low power and thus relatively inexpensive wireless technology such as, for example, Bluetooth wireless technology (under about 10 milliwatts of power) or other low power (defined as generally under 100 milliwatts of power) communications suitable for providing the needed communications over the relative short distance (for example, a distance of up to about 25 feet) between a sub-sensor device 15 and its nearby sensor device 14. Whenever Bluetooth technology is referred to herein, it is to be understood that other suitable low power wireless technology may be substituted therefor. Thus, for communications between a sub-sensor device 15 and its associated sensor device 14A, the sub-sensor microprocessor 13 may have non-volatile memory and minimal volatile memory, and each of them 15 and 14A has a Bluetooth transceiver 19 and 25 respectively with the microprocessors 13 and 12 respectively suitably programmed, in accordance with principles of common knowledge to those of ordinary skill in the art to which the present invention pertains, for communications there between (for both transmitting and receiving). As an alternative to Bluetooth technology, the well known hub and spoke technology may be used at a low power frequency of 900 megahertz or 315 megahertz in North America or 433 megahertz or 868 megahertz in Europe, or other suitable frequency may be used for communication distances up to about 300 feet.

Communication between sensor devices 14 and other sensor devices 14 and the detectors 20 preferably utilizes ZigBee (low-cost, low-power, wireless networking for device monitoring and control) or 6LoWPAN (such as IPV6, which is internet protocol version 6 over low power wireless personal area networks) technology, which are higher power than the less expensive and lower power technology such as Blue Tooth technology and which are considered adequate for the communication between the sensor devices 14 and their more closely spaced sub-sensor devices 15 (can communicate with Blue Tooth technology over a distance up to about 25 feet and about 300 feet using hub and spoke technology). The well-developed and well known ZigBee communications, at a frequency of 2.4 gigahertz, can provide inexpensive communications between two communications devices up to about a quarter mile at the most (that is, without the benefit of multi-hop, and of course indefinitely with multi-hop or range extending routers). The newer 6 LoWPAN technology, currently under development, as well as ZigBee technology, at a frequency of 900 megahertz in North America, can provide communications over a distance up to several miles. Both ZigBee and 6 LoWPAN technology are wireless personal area networks (WPAN) while Blue Tooth technology is an open wireless technology that allows electronic devices to communicate over short distances (on the order of up to about 25 feet).

In order to connect a sub-sensor device 15 to a sensor device 14 for relay of sensing data thereto, the sub-sensor device 15 must be in sufficient proximity (within about 25 feet using Bluetooth technology and about 300 feet using hub and spoke technology) to and compatible with the sensor device 14, i.e., a GC sub-sensor device would normally communicate with a GC sensor device but would not normally communicate with a nuclear sensor device.

The sensor device 14 and any sub-sensor devices 15 are desirably physically arranged with such number and closeness, blanketing the Venue (selected area such as an airport), that it may be said that all or substantially all the physical space in a Venue is sampled, as may be required on an on-going basis, and the failure of any one sensor device 14 or related sub-sensor device 15 accordingly may have a minuscule or non-impact on the sensing integrity and continuity of data sensing for the Venue, due to the redundancy in the system.

The sensor and sub-sensor devices 14 and 15 respectively are provided with a suitable modular construction so that their sensors 16 and related sub-sensors 17 can be easily replaced (such as when they become inoperative) and to be replaced with sensors and sub-sensors for other environmental conditions and the microprocessors 12 and 13 thereof respectively suitably re-programmed. Accordingly, the sensor and sub-sensor devices 14 and 15 respectively of such modular construction may be referred to herein and in the claims as sensor modules and sub-sensor modules respectively or as modular sensors and modular sub-sensors respectively. It should however be understood that a sensor or sub-sensor device, when used herein and in the claims, may or may not be modular. For example, a sensor device and its related sensor may be constructed in a modular fashion, in accordance with principles of common knowledge to those of ordinary skill in the art to which the present invention pertains, so that a gas chromatograph sensor for certain gases may be replaced with a suitable gas chromatograph sensor for other gases, wherein they are suitably constructed to be thusly interchangeable, and its microprocessor 12 suitably re-programmed by the central monitoring unit 26, in accordance with principles of common knowledge to those of ordinary skill in the art to which the present invention pertains. While, as previously discussed, multiple sensor devices 14 and sub-sensor devices 15 of the same type may be placed in a Venue (selected area such as an airport) to provide redundancy, various other types of sensor devices 14 and sub-sensor devices 15 may also be placed in the venue. The digital operation of the sensor devices 14 and detectors 20 allows such multiple and replaceable (plug-in) uses.

While sensor devices 14 and sub-sensor devices 15 may normally be battery operated, routers 23 or relay sensor devices (such as the sensor device illustrated at 14S, which relays information from sensor device 14B to detector 20B) may be powered by alternating current electricity and have battery backup power, and the self-organized wireless (multi-hop) network desirably effects sensor device demand to be equalized to optimize battery life, and complementary energy harvesting power sources such as solar or wind or vibration or otherwise may be used as suitable. For, some Venues or conditions, such as landfill sites, the sensor devices 14 and sub-sensor devices 15 may be suitably programmed by the central monitoring unit 26 to shut down (sleep) for a period of time, such as an hour or until a specific event occurs that causes an instant power up (wake-up), in accordance with conventional technology.

A MAC (media access control) address is a unique hexadecimal identifier for each detector 20 and sensor device 14 in accordance with the 802.15.4 IEEE standard. A PAN ID (personal area network identification) is a hexadecimal identifier that, in this implementation, is unique for each detector 20 and related censor devices 14 and ensures that they are transmitting/receiving on the same wireless frequency. By hexadecimal is meant base 16, and this identifier may be from 0x0000000000000234 to 0xFFFFFFFFFFFFFFFF, where 0x (which is the numeral zero followed by the letter x, here and elsewhere in this specification for identification of a PAN ID) signifies that a 16-position hexadecimal PAN ID identifier follows, wherein only one of the digits 0 to 9 and letters A to F are allowed in each of the 16 positions. This number allows the switching of a sensor device 14 from one detector 20 to another, for use, for example, to add a sensor device, to remove a sensor device and add another if it malfunctions, to remove a sensor device, to connect a sensor device to a different detector, or for other needs as the circumstances may require, in accordance with principles commonly known to those of ordinary skill in the art to which the present invention pertains. The PAN ID is not needed for the sub-sensor devices 15 as Blue Tooth and hub and spoke technology do not need or use PAN ID.

A sensor device, such as what is referred to herein as a smart sensor device 14S, may desirably be equipped with a smart plug, illustrated at 47, which is shown at 48 plugged into a power source (wall outlet) of alternating current to provide the needed amount of power, connected to the microprocessor 12 for suitable control of and receipt of information therefrom, and equipped with suitable battery back-up to provide emergency power. A smart plug is a device that enables/disables electrical power to remotely operate/turn off a device such as a heater or a garage door opener or an electrical light as well as provide information via its microprocessor as to the condition (open or closed garage door, on or off light or heater, electrical amperage being consumed, etc.). The smart plug 47 is a sensing and enabling module that communicates with a detector 20B via the sensor device microprocessor 12, and the CMU 26 is suitably programmed for automatic on/off patterns thereof. The client browser 30B or another suitable browser is used to access the CMU 26 to modify or override (as appropriate) the on/off patterns.

For example and not for the purposes of limitation, as illustrated in FIG. 1, in what is known as an M2M (machine to machine) application, the smart plug sensor device 14S may communicate with the CMU 26, through the multi-hop router 23 and detector 20B, using a suitable addressing scheme and check-in timing, such as MAC (Media Access Control) addressing, which is the same addressing scheme and check-in timing used to communicate with the other sensor devices 14. The CMU 26 manages communications with sensor devices 14 using normal state heartbeat and aware state (described hereinafter with respect to FIGS. 2 and 3) heartbeat check-in to control the interval between scheduled responses from the sensor devices 14. For example, a sensor device may be directed to check in with sensor reading/condition data in 5 minute intervals (normal state heartbeat) or 1 minute intervals (aware state heartbeat) respectively, subject to unexpected event occurrences (emergency events) that result in immediate sensor 14 check-in to the CMU 26. The client will choose the CMU 26 check-in interval timing and alert system settings during initialization (discussed hereinafter with respect to 202 in FIG. 3) and thereafter and during monitoring, based on the client's unique needs. Subsequently, for example, when the CMU 26 receives sensor data (such as temperature, light level, and amperage) from sensor device 14S, during the normal state or aware state heartbeat check-in or emergency event response check-in activities, a return acknowledgement by the CMU 26 to the sensor device 14S may include a code to disable or enable the smart plug electric AC outlet 47 that is part of the sensor device 14S, for example, to control a lamp, based on information residing in the CMU 26, for sensor device 14S. This information may include electrical outlet enabling times such as by day, day of week, type of day, and time of day, as specified by the client for its particular needs and which are populated by the client on an as received basis, with browser management control and updating by smartphone, tablet, laptop computer, or other suitable device, as required. When these actions have been requested to occur, the sensor device 14S, in accordance with the example, confirms that the lamp light is on or off as requested by sensing the light level and/or amperage draw or otherwise as suitable to ensure that the requested physical action has actually occurred. This sensed data is transmitted to the CMU 26 during check-in for assessment and for alert processing if the requested physical action has not occurred. Thus, after a sensor device 14S has enabled its electric outlet and the light from the lamp and amperage draw (from the lamp attached to that outlet) have not increased, the CMU declares an alert state. Furthermore, by way of example, the functionality controlled by other 14S-like smart sensor devices may be said to be virtually unlimited, including, for example but not limited thereto, staged opening and closing of window blinds, turning audible and/or visual alarms on or off, making light adjustments in stages, controlling illuminated signs based upon certain conditions such as the presence of vehicles, controlling zone irrigation systems based upon sensed need, and controlling warehouse and underground parking lighting based upon the activity in each zone.

In Venues or places such as an airport, the smart plug sensor device 14S may be plugged into a wall socket 48 so that it receives alternating current for operation, and a battery backup unit may be connected, to provide emergency power, allowing the sensor device 14S to immediately report if it has been unplugged or electrical power is off. It should be noted in FIG. 1 that the smart sensor device 14S (as well as other sensor devices 14) is suitably equipped and programmed to also function as an intermediary router, thusly illustrated as receiving information from sensor device 14B and relaying it to detector 20B. A sensor device 14S may be equipped with a web cam so that the client, in addition to turning on and off various devices such as heaters, motion detectors, smoke detectors, and lights, can see the locations being controlled, such as, for example, providing a web cam (and/or motion sensor, and/or door open/close sensor, and/or voice recorder/speaker) at every entrance and exit of a property. The smart plug device 14S is suitably programmed with the automatic ability to have it routed to another upstream sensor device 14 if the multi-hop path from the smart plug device 14S to the detector 20B is interrupted for some reason.

Sensor devices 14 for many threats are large and cumbersome to be carried around and otherwise be mobile or portable. Sometimes, it may accordingly be necessary or desirable that a sensor device 14 be portable, for example, so that it can be carried around by security officers or government or airport employees or military personnel or others. For example, current pre-production gas chromatographs that detect 3 compounds simultaneously are of a size on the order of a shoebox while those detecting 10 compounds simultaneously are of a size on the order of a large suitcase. In accordance with the present invention, the overall size of gas chromatograph ("GC") sensor devices (and other sensor devices 14) is reduced to on the order of the size of a smartphone, or smaller, in order that they may be easily worn by HAZMAT early-responder personnel, firefighters, military personnel, airport employees, government employees, etc. or be installed on robots. The reduced size also offers the advantage of the capability of being hidden better for surveillance purposes. While maintaining the small size, the number of critical conditions, gases, compounds, and rays which can be sensed/detected has increased from the conventional 3 to 10 for a small size gas chromatograph sensor device to on the order of 100 compounds or more simultaneously.

A portable sensor device in accordance with the present invention is illustrated at 14P in FIG. 1. In view of their being powered by battery and/or solar power or other low power and due to landscape obstacles, the range between the portable sensor devices 14P and their associated closest detectors 20 may be limited to perhaps 500 to 1000 feet. In order to allow a portable sensor device 14P, which may be battery powered, to be used over greater distances and for innovative new applications requiring smaller size sensor devices and for true portability and movement in small spaces, its communication with its respective detector 20P is preferably via a 3G or 4G or similar cellular network or alternatively a WiFi network, illustrated at 36, wherein the information is transmitted to a transceiver 38, having antenna 42, on the nearest WiFi or cellular tower 40 and then re-transmitted to the associated detector 20P.

The sensor device 14P is provided to be portable so that it can be carried around in a vehicle and also provided with the ability to store data, in accordance with principles commonly known to those of ordinary skill in the art to which the present invention pertains, so that the client may download the data from sensor devices 14 to detectors 20 while driving in their vicinity and later download the data to the CMU 26 in accordance with client needs, such as when the vehicle moves within range of a cellular network, WiFi network, or satellite network or is connected to an SSL (secure sockets layer) broadband ethernet connection.

To provide the desired portability or mobility, GC to a size with battery and pre-concentrator of about 8" times 8" times 8", or less, in accordance with the present invention, portable sensor devices 14P including those having gas chromatographs (and called MicroGCs) with pre-concentrators are made with miniaturized MEMS technology. Examples of suitable small gas chromatographs and pre-concentrators made with MEMS technology for use as portable sensor modules 14P are found in U.S. Pat. Nos. 6,838,640 and 6,914,220 and published application 2004/0255643, which are incorporated herein by reference. Other patents related to such gas chromatographs include U.S. Pat. Nos. 5,281,256; 5,288,310; 6,702,989; 6,764,652; 7,008,193; 7,438,851; and 7,615,189, all of which are also incorporated herein by reference. Other patents relative to modular or compact sensor modules or the like include U.S. Pat. Nos. 4,864,843; 5,340,543; 5,804,701 (col. 2 has discussion of miniaturization efforts); U.S. Pat. Nos. 5,808,179; 5,918,194; 6,029,499 (CIP of U.S. Pat. No. 5,808,179); U.S. Pat. Nos. 6,632,268; 6,732,567; 6,834,531; 7,081,816; 7,247,189; 7,366,624; 7,384,453; 7,506,533; 7,524,363; 7,600,413; 7,654,130; and 7,743,641, published applications 2009/0139934; 2009/0150087; 2009/0151426; 2009/0158815; 2010/0018287; 2010/0154511; and 2010/0248283, and Japanese patent document JP08184514, all of which are also incorporated herein by reference.

Other gas chromatograph patents/published applications include U.S. Pat. No. 4,719,011 (variable geometry columns); U.S. Pat. Nos. 7,464,580; 7,647,812; 7,742,880; 7,806,963, and published applications 2006/0163161, 2007/0029241, 2007/0084982, 2007/0089603, 2007/0090034, 2007/0221557, 2008/0121015, 2008/0164148, 2008/0202211, 2010/0083739, 2010/0187177, 2011/0018545, 2011/0023976, 2011/0028669, 2011/0091986, and 2011/0049030, all of which are also incorporated herein by reference. Suitable radiation detectors are disclosed in published applications 2011/0155928, 2009/0114829, 2009/0101825; 2009/0001286; and 2007/0235657, all of which are also incorporated herein by reference.

Suitable wireless sensor devices are, for example, the wireless sensors marketed by Digi International, Inc. of Minnetonka, Minn., and other suitable sensor devices 14 and 15 are, for example, a line of smaller, more robust, and accurate sensors such as disclosed in the above patents/published applications and being considered for incorporation into a network incorporating the present invention by Detection Innovations, Inc. of Dayton, Ohio and Toronto, Canada, Applicant being an officer of Detection Innovations, Inc.

Single purpose sensor devices for compounds such as sarin and the like or other sensor devices may not remain accurate as temperature, humidity, barometric pressure, and the like increase or decrease over time unless otherwise suitably adjusted therefor. In order to provide sensor devices 14 and/or sub-sensor devices 15 with the ability to sense directly related data (data such as temperature, humidity, barometric pressure, and the like that have a direct bearing on the sensed value of a critical condition such as presence of a chemical compound or radiation being sensed) and to utilize this sensed directly related data to adjust the sensed value of the critical condition, so as to provide an adjusted sensed value of the critical condition which is more accurate than the unadjusted sensed value, a sensor device 14 and/or a sub-sensor device 15, as desired to improve accuracy of sensed readings, is provided with du additional sensor 50 for the sensing of such directly related data to supply to the microprocessor 12 or 13 along with the data from sensor 16 or 17 respectively so that the sensed value of data (a critical condition) received from sensor 16 or 17 respectively can be suitably adjusted by such directly related data. For example, as humidity increases, this allows the sensed concentration value of a chemical compound (a critical condition) to be suitably adjusted therefor.

A sensor device 14 or sub-sensor device 15 may be suitably equipped and programmed, in accordance with principles of common knowledge to those of ordinary skill in the art to which the present invention pertains, with the well known conventional cellular triangulation positioning and/or GPS (global positioning system) technology in a manner such that an unauthorized movement of these sensor devices is immediately communicated to the associated detector 20 and then to the central monitoring unit 26.

In air sampling applications, as an alternative to installing physically dispersed sub-sensor devices 15 around their related sensor device 14, an air delivery sub-system may be installed in a Venue, to pass calibrated known volumes of air from various locations within the Venue through the sensor devices 14 and thereby to alternatively ensure that the air from the entire Venue is sampled, rather than just the air in the particular physical location of each sensor device 14 for a detector 20 in a Venue. When an air delivery sub-system is not installed, as previously discussed, sub-sensor devices 15 with low-cost sensors 17 are provided to economically blanket a Venue with sensors, to increase the probability of, for example, detecting sources of radiation (a ray, of interest, must strike a sensor or sub-sensor to have its magnitude determined). Likewise, there are many different sources of chemical contamination in a Venue (such as an airport), and the plurality of sub-sensors 15 associated with a particular sensor 14 significantly increases the probability of detecting the presence of these sources of chemical contamination and determining its magnitude and pinpointing its location for subsequent action by authorities.

As previously discussed, a detector unit 20 is desirably configured with a plurality of sensor devices 14 and preferably their associated physically dispersed sub-sensor devices 15. The sensors 16 and 17 are preferably equipped with solid state CMOS (complementary metal-oxide semiconductor) memory and/or another low power technology design that facilitates the use of long life rechargeable or replaceable batteries (with multi-year life) that can withstand and reliably operate in a wide temperature range and humidity range and harsh environments. In view of such harsh environments, the electronic components therefor may be built, for example, to similar specifications as those often used by the U.S. military for building electronic components to be used in harsh environments, including being shock mounted and being sealed to prevent moisture penetration. Each sensor device 14 is suitably configured to interface with and receive unique Venue information such as, but not limited to, the unique code in an RFID (radio frequency identification) chip or other electronic identifier technology, electronic anti-tamper seal status, door contact status, GPS coordinates, cellular triangulation coordinates, sensor/sub-sensor device interactive status, temperature sensor, humidity sensor, liquid depth sensor and liquid point sensor, moment of inertia sensor, and incorporates replaceable sensor/sub-sensor devices, with or without electronic anti-tamper seal, to reliably detect a wide range of Threats, across a broad temperature range such as from about −20 to +120 degrees F. (preferably from about −50 to +185, degrees F. with accuracy of plus or minus 1 degree F. and resolution of 0.1 degree F.) and with non-condensing humidity up to 95%, that are in concentrations outside predetermined thresholds and/or commanded thresholds over a predetermined and/or commanded period of time and based on a predetermined and/or commanded time frequency.

The information gathered by each detector 20 is desirably encrypted and transmitted to the central monitoring unit 26, such as over the internet 28 using a secure SSL ethernet broadband connection, and/or by cellular network (such as, for example, 3G or 4G), and/or by WiFi, and/or by satellite, wherein the information from the various sensor and sub-sensor devices 14 and 15 respectively and related detectors 20 is pulled together and analyzed to look for sensed data that is outside thresholds or condition non-compliance or pattern non-compliance. Other means of communication between detectors 20 and the central monitoring unit 26 include, but are not limited to, low orbit satellite system (LOSS), microwave systems (including WiMax or other), and Inmarsat systems. After validation by an "expert system" (which is part of the programming running within the central monitoring unit 26 and is the programming used to decide whether to declare an alert, as illustrated at 214 and discussed hereinafter), the sensed information that is found to be outside thresholds or non-compliant with expected conditions, or information that a detector and/or sensor and/or sub-sensor fails to communicate, triggering a declaration of an alert, as illustrated at 214 and discussed hereinafter, may be categorized as either an Urgent Alert Notification or Alert Notification and is immediately communicated to the client's responsible parties by email or text message notification at their specified desktop, laptop, cellphone, smartphone or tablet destinations, as illustrated at 30A, and/or an appropriately verified voice call notification 300 is placed to responsible parties such as via a call center 30C. Notwithstanding, if there are a plurality of Venues at a particular location, such as containers on a ship or on an aircraft, an optional "Base Station" or the like may be used to concentrate and multiplex all communications between the detectors 20 and the central monitoring unit 26.

The central monitoring unit 26 is also programmed to transmit information (desirably encrypted) to the detectors 20 for control thereof. The central monitoring unit 26 may also interface with the client system 30E (or optionally with others as may be desired) via VPN or SSL (virtual private network or secure sockets layer respectively) (both passing encrypted data over the Internet), or equivalent Internet, intranet, or non-internet leased line connectivity, to provide salient information and real-time notification alerts or other information (desirably encrypted). The client system 30E refers to, for example, the client's computer whereas the browser 30B may be any internet browser used for accessing the CMU 26. The client browser functionality (browser) 30B is programmed to allow anyone with system administrator credentials, and authentication and authority, for the client, and browser internet connectivity, to securely access the central monitoring unit 26 to review and update the client profile and detector and sensor parameters, and review the current detector and sensor transaction details, including those currently in normal, aware, potential alert, alert, or urgent alert state (discussed hereinafter with respect to FIG. 3) (and the current state of any ongoing alert situations) and their past history, and view sensor graphs to quickly obtain a snapshot of current sensor performance and past performance, and alternately export the data to a formatted CSV (comma-separated value) spreadsheet for analysis by the client.

Optionally, a special version of the central monitoring unit 26 (which may then be called a local monitoring unit) may be operated by a contractor for a client 30E who is a military unit or a government agency or a corporation that chooses to run all of its applications in-house.

Any of the sensor devices 14 and any of the detectors 20 may be suitably programmed for transmission of information back and forth between a particular sensor device 14 and a particular detector 20 as desired, including the optional dynamic inclusion of routers 23 and/or sensor device/routers 146 in a multi-hop path, and the programming may be changed at any time as desired for communication of a sensor device 14 or router with a different detector 20, whereby the network 10 is a multi-hop wireless self-managed type that automatically coordinates sensor devices/routers with detectors, as new detectors are added or sensor devices/routers are added, deleted, or physically moved or transferred between detectors. This functionality would desirably be made available to the authorized client administrator.

Sensor devices 14 (as well as sub-sensor devices 15) may be radiation sensing devices. These devices are provided to detect Threats including, but not limited to, fissile material and/or gamma radiation and/or radiological dispersion devices and/or other radiation sources. The radiation sensing device 14 may, but is not required to, use nanotechnology, nanowires, Geiger-Mueller tube detectors, photonic crystal technology, solid state detectors, scintillation detectors and the like, and MEMS or other technology to accurately detect the amplitude of radioactive rays as the radiation sensing devices (and any dispersed sub-sensing devices) are exposed to radiation sources across a wide range of Venues, with the amplitude to be provided by the sensor devices 14 and decisions whether to declare an alert 214 determined as discussed previously with reference to FIGS. 2 and 3.

The radiation sensing devices (and any sub-sensing devices) may use a specific element and/or elements that will be exposed to fissile material and/or gamma radiation and/or radiological dispersion devices and/or other radiation sources. The radiation sensing devices (and any sub-sensing devices) may have a refresh and regeneration capability so that they need not be replaced during normal operation, although they may potentially need to be replaced after the detection of a substantial radiation threshold exceedance, depending on the magnitude of the exposure.

Sensor devices 14 and 15 may be chemical sensing devices. These devices are provided to detect Threats including, but not limited to, sarin gas (a nerve agent), chlorine (a choking agent), and hydrogen cyanide (a blood agent). These devices may, but are not required to, use gas chromatography (GC and microGC), GC/mass spectroscopy, ion mobility spectroscopy, LIDAR, terahertz/mm wave, surface acoustic wave, and micro sensor arrays, and MEMS or other suitable technology to accurately detect ranges of chemical agent Threats, and these devices may be exposed to dangerous chemical sources across a wide range, including air, water, and food.

These chemical sensing devices 14 and 15 may use a specific element and/or an array of elements that will be exposed to dangerous chemical agents. The chemical sensing devices 14 and 15 may have a refresh and regeneration capability so that they need not be replaced during normal operation, although they may potentially need to be replaced after the detection of a substantial dangerous chemical agent threshold exceedance.

Sensor devices 14 and 15 may be explosive sensing devices. They are provided to detect ammonium nitrate, urea nitrate, potassium nitrate, acetone, calcium carbide, peroxide, blasting caps, and other explosives agents or bomb components. These devices may, but are not required to, use gas chromatography (GC), GC/mass spectroscopy, ion mobility spectroscopy, LIDAR, terahertz/mm wave, surface acoustic wave, micro sensor arrays, and ionic liquid (IL) sensor technology, and MANS or other suitable technology to accurately detect ranges of the components-of-bombs, and these devices may be exposed to potential explosive compounds, vapors, agents, and liquids across a wide range, including in air, water, and food.

These explosives sensing devices 14 and 15 may use a specific element and/or an array of elements that will be exposed to various potential components-of-bombs. The chemical sensing devices (and any sub-sensing devices) may have a refresh and regeneration capability so that they need not be replaced during normal operation, although they may potentially need to be replaced after the detection of a substantial threshold exceedance of components-of-bombs, such as a large amount of ammonium nitrate.

Sensor devices 14 and 15 may be biological sensing devices. These devices are provided to detect dangerous biological agents including, but not limited to, anthrax, cholera, sarin, and smallpox. These devices may, but are not required to, use DNA microarrays, immuno assay, LIDAR, terahertz/mm wave, standoff laser-induced breakdown spectroscopy, and micro sensor arrays, and MEMS or other suitable technology to accurately detect ranges of biological agent threats, and these devices may be exposed to dangerous biological sources across a wide range, including in air, water, and food.

The biological sensing devices (and any sub-sensing devices) may use a specific element and/or an array of elements that may be exposed to various dangerous biological agents. The biological sensing devices (and any sub-sensing devices) may have a refresh and regeneration capability so that they need not be replaced during normal operation, although they may potentially need to be replaced after the detection of a substantial dangerous biological agent threshold exceedance.

A sensor device 14 or 15 may be a hazardous material (HAZMAT) and volatile organic compound (VOC) sensing device. These devices are provided to detect dangerous compounds and vapors, including those specified by the Department of Homeland Security, DOD, Dept. Of Transportation, EPA, and other government and private bodies, both current and on an on-going basis, in the United States and in other countries throughout the world, including, but not limited to, vinyl chloride, PCE, TCE, benzene, and hydrocarbons. These sensor devices may, but are not required to, use gas chromatography (GC and microGC), GC/mass spectroscopy (MS), and micro GC/MS, and MEMS or other suitable technology to accurately detect ranges of HAZMAT/VOC compounds and agent threats, and these modules may be exposed to dangerous compounds and agents across a wide range, including in air, water, and food.

The HAZMAT/VOC sensor devices 14 and 15 may use a specific element and/or an array of elements that may be exposed to various dangerous agents. The HAZMAT/VOC sensing devices (and any sub-sensing devices) may have a refresh and regeneration capability so that they need not be replaced during normal operation, although they may potentially need to be replaced after the detection of a substantial dangerous hazardous material and/or volatile organic compound or vapor threshold exceedance.

A sensor device may be a food, air, water toxins, and disease (Toxin/Disease) sensing device 14 or 15. These devices and sub-sensing devices are provided to detect and actively improve air, food, and water safety, and include but are not limited to, bacterial pathogens, antibodies, patulin, mycotoxins, toxins (e.g., *E. Coli* on raw meat and *listeria* on ready-to-eat meat), carcinogens, TB, cholera, and anthrax, and including, but not limited to, those specified by the Department of Homeland Security, DOD, Dept. of Transportation, OSHA, EPA, World Health Organization, and other government and private bodies, both current and on an on-going basis, both in the United States and in other countries throughout the world. These devices may, but are not required to, use imprinted conducting polymer, paramagnetic polystyrene beads, and nano-biosensors, and MEMS or other suitable technology to accurately detect toxins and disease threats, and these devices may be exposed to such dangerous agents and disease across a wide range, including in air, water, food, and people (including those in developing poor countries that are or may experience a TB, cholera, or smallpox resurgence).

The toxin/disease sensing devices (and any sub-sensing devices) may use a specific element and/or an array of elements that will be exposed to various dangerous bacterial pathogens, antibodies, patulin, mycotoxins, toxins, carcinogenics, and the like. The toxin/disease sensing devices (and any sub-sensing devices) may have a refresh and regeneration capability so that they need not be replaced during normal operation, although they may potentially need to be replaced after the detection of a substantial threshold exceedance.

A suite of sensor devices 14 and 15 may be deployed to identify unexpected events and/or critical conditions. These devices may detect unexpected water consumption and/or escape, fuel demand, electricity consumption, humidity, temperature, impact and/or inertia, and GPS-location or cellular triangulation non-compliance (e.g., in a condominium, transit agency, or trucking fleet). These devices may, but are not required to, use input from various flow-meters, electronic humidity sensors and thermometers, light sensors, water presence and depth sensors, motion sensors, open/closed sensors, moment-of-impact/inertia sensors, GPS and cellular triangulation technology, and MEMS or other suitable technology.

A sensor device 14 or 15 may be a residential, commercial, or industrial threat sensing device. This device is provided to detect threats including, but not limited to, fire, smoke, carbon monoxide, carbon dioxide, home security, air/water/foodborne VOCs, and other compounds identified by the EPA, fire standards organizations, and other governmental protection agencies, both current and on an on-going basis, both in the United States and countries throughout the world. These devices may, but are not required to, use nanotechnology, nanowires, and MEMS or other suitable technology and may use a heat process (which may be patented) to increase the sensitivity and reliability of detecting a wide range of potential environmental contaminates to accurately detect the exposure to such elements, compounds, and vapors across a wide range.

It should of course be understood that the present invention is not limited to the specific threats discussed herein and can be used for detection of other Threats now existing or Threats currently unknown but which may hereafter exist in the future.

The central monitoring unit 26 must verify and initialize each uniquely identified detector unit 20 for a client. When verified, the central monitoring unit 26 downloads the detectors' setup parameters and those for all uniquely identified sensor devices 14, portable sensor devices 14P, and sub-sensor devices 15 that are allowed to be connected to the uniquely identified detector 20. In turn, as each sensor device 14 checks in with the associated detector 20, their unique identity is verified, prior to initialization, illustrated at 202 and discussed hereinafter. When verified by the detector 20, the setup parameters, including check-in heart-beat parameters, for each related sensor device 14 and any related sub-sensor device 15 are downloaded to each sensor device 14 and subsequently by the sensor devices to the sub-sensor devices 15.

The mere inputting of threshold values as determined by a government agency or other clients and the sounding of a local alarm if there is non-compliance with the threshold values (even for a number of sensor devices in an area) has historically meant that there are so many false positives that they make use of the system impractical. For example, a system may be purchased for an army unit overseas and installed to detect radiation or the components of bombs. Yet the number of false positives may be so great, due to the background residual explosive material in the air, at certain times of the day or after certain events have occurred, that the military unit starts to ignore the system, to their detriment when a real explosive threat occurs.

Figure 2:
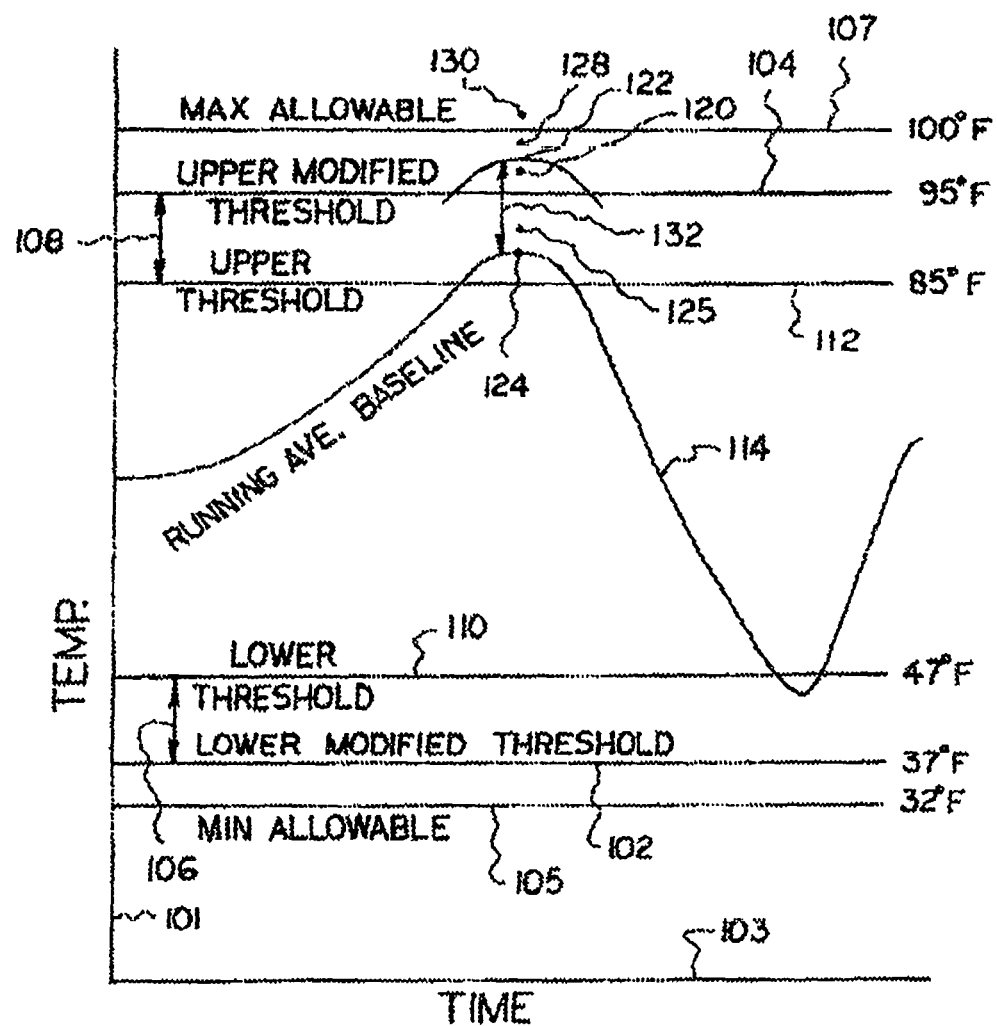
FIG. 2 is a diagrammatic view illustrating how the system is used to determine whether to declare an alert.
Figure 3:
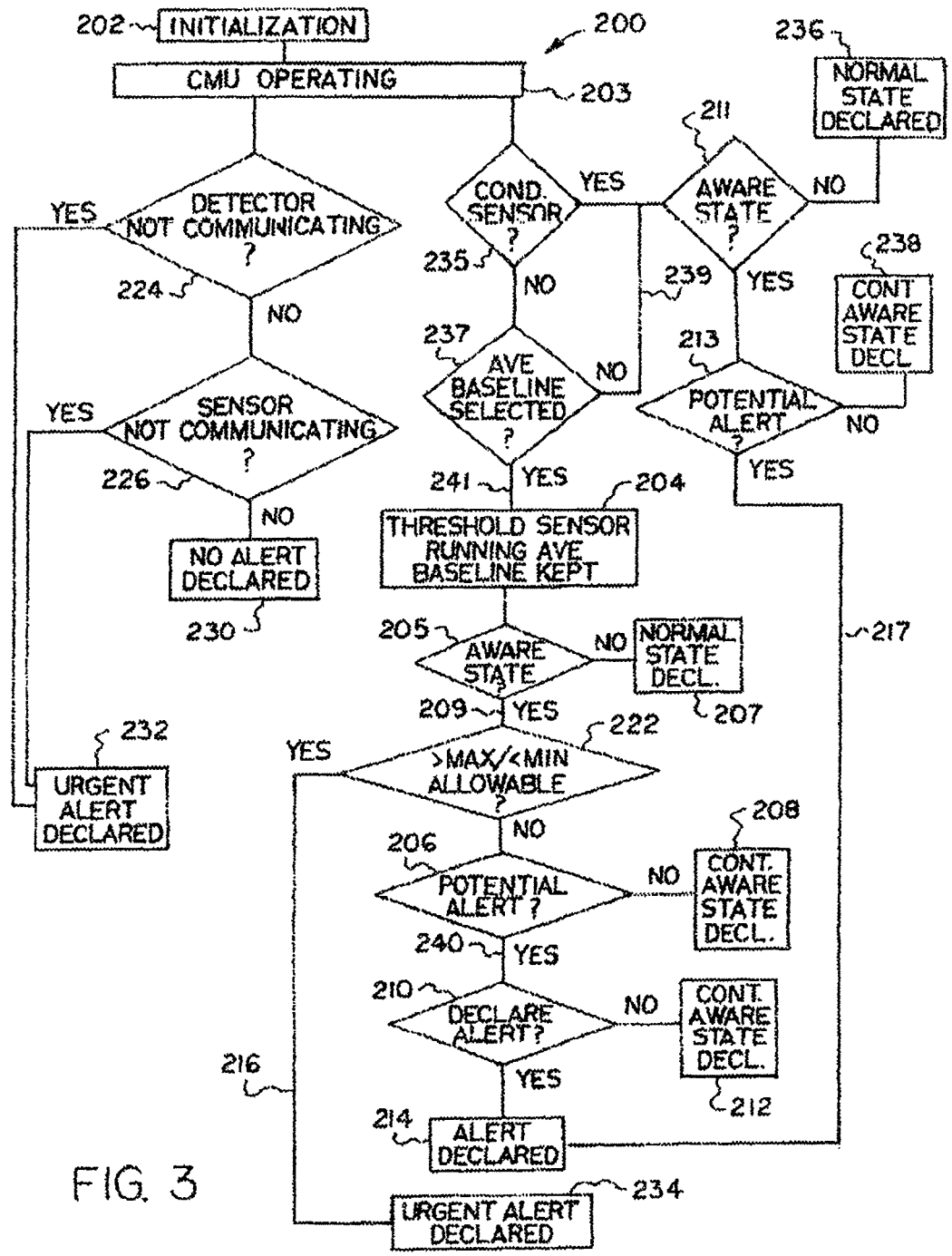
FIG. 3 is a block diagram illustrating the steps in making a decision whether to declare an alert.

Referring to FIGS. 2 and 3, in order to reliably reduce false positives while not introducing false negatives, i.e., take into account anomalies while also smoothing over time the data received into a running average baseline to which newly received data is compared, in accordance with the present invention, the central monitoring unit 26 (in FIG. 1) is suitably programmed, using principles commonly known to those of ordinary skill in the art to which the present invention pertains, to carry out the method, illustrated generally at 200 in FIG. 3 and the use of the method 200 being illustrated by the hypothetical example of FIG. 2, to determine whether an "alert" should be declared, as illustrated at 214, or an "urgent alert" should be declared, as illustrated at 234. Such programming to carry out the method illustrated in FIGS. 2 and 3 can be suitably done by a programmer of ordinary skill having the knowledge of the present invention as contained herein.

FIG. 2 is a hypothetical example relative to temperatures, along the ordinate 101, over time, along the abscissa 103, in a steel mill wherein labor laws may require that the temperature be maintained at all times no less than 32 degrees F. and no greater than 100 degrees F., these being the minimum and maximum allowable values, illustrated at 105 and 107 respectively. Thus, clearly, in this example, an alert should be declared if the temperature exceeds 100 degrees F. or drops below 32 degrees F. Thus, whether or not the process/system illustrated in FIG. 3 would otherwise result in the declaration 214 of an alert, the client may determine as part of initialization 202 that the process/system is to be over-rode, as illustrated at 216, and an urgent alert declared, as illustrated at 234, if a decision is made, as illustrated by decision block 222, that a maximum or minimum allowable value 107 (for example, 100 degrees F.) or 105 (for example, 32 degrees F.) respectively is reached. For example, if there is a reading of 102 degrees F., as illustrated at 130, which is greater than the maximum allowable temperature 107 of 100 degrees F., the CMU may be programmed/inputted as part of the initialization 202 by the client, to declare an urgent alert 234 even if the process/system 200 would not have otherwise declared an alert. In other applications, there may be need for only a minimum allowable value 105 or a maximum allowable value 107. In many applications, there may be no need or desire by the client to have either a minimum or maximum allowable value (in which case the flow chart of FIG. 3 would not have decision block 222). For example, for nuclear or dangerous gases as well as many other of the hereinbefore discussed threats for which the process/system 200 of the present invention is applicable, it would not normally be necessary to have a minimum or maximum allowable value, since when the level gets high enough, in accordance with the values inputted during initialization, the alert will be declared, as illustrated at 214.

While what is contained in decision block 222 in FIG. 3 is brief to accommodate limited space, in order to be more clear, referring to FIG. 2, being in potential alert state 240, which allows the declaration of an alert 214, means being at a value which is either (1) greater than the upper threshold 112 value or the running average baseline 114 value (whichever is greater) plus the upper fluctuation buffer 108 value or (2) less than the lower threshold 110 value or running average baseline 114 value (whichever is less) less the lower fluctuation buffer 106 value.

It should of course be understood that it may be desirable to take appropriate action before a minimum or maximum allowable value 105 or 107 were reached since the mill would already be in violation of the labor law if the alert were not declared until after the minimum or maximum allowable value 105 or 107 were reached. In order to have sufficient time to take appropriate action before the minimum or maximum allowable value 105 or 107 is reached, lower and upper modified threshold temperatures, illustrated at 102 and 104 respectively are suitably selected, which allow time to declare an alert, as illustrated at 214, so that appropriate action can be taken before the temperature reaches the minimum or maximum allowable value 105 or 107. Suitably selected fluctuation buffer zones, illustrated at 106 and 108 for the lower and upper modified thresholds 102 or 104 are also established that relate directly to the lower and upper threshold values, illustrated at 110 and 112 respectively, which may, for example, be 47 degrees F. and 85 degrees F. respectively to provide 10 degree F. lower and upper fluctuation buffers 106 and 108 respectively, these being values which may not often occur during normal operation, although a blast of hot air may cause the temperature to climb temporarily above 85 and even 95 degrees F., thereby producing what may be called a false positive, if not for the intervention of the process of the present invention to keep an alert from being declared. It should of course be understood that the lower and upper fluctuation buffers 106 and 108 may be selected to have different values (including that one can be different from the other).

In this example, the upper values 104, 107, and 112 will be primarily treated, it being understood that the same principles and analysis and process would apply to the lower values 102, 105, and 110 respectively.

Illustrated at 114 is a running average baseline of temperatures for a particular sensor 16 or sub-sensor 17 for a particular recurring period of time such as, for example, a 24-hour period of time, since many check-in events may re-occur, at the same time each day. For example, a blast of hot air, due to the temperature briefly spiking at about the same time each day, may result in the running average baseline at about that same time each day being briefly over the upper threshold value 112 of 85 degrees F., i.e., showing in FIG. 2 a running average baseline temperature at that time, as illustrated at 124, of 88 degrees F. For example, at that particular time on a particular day, the temperature is 90 degrees F., as illustrated at 125, which is shown to be above the running average baseline temperature 124 of 88 degrees F. There may, for example, be a different running average baseline 114 for Saturday and another for Sunday, particularly if there is less utilization of the mill during those days, or there may be a different running average baseline 114 for each day of the week, as may be appropriate considering how the mill is utilized. Other time periods may alternatively apply as appropriate. The running average baseline 114 may, for example, be adjusted as the outside temperature changes.

As illustrated at 202, the client 30B, during initial setup and subsequent updates, selects and enters the maximum and minimum allowable values 107 and 105 respectively, if any, the upper and lower threshold values 112 and 110 respectively, and the upper and lower fluctuation buffer threshold values 108 and 106 respectively along with sensor parameters into the central monitoring unit (CMU) 26, and selects and enters an initial baseline value for the particular sensor(s) 16 for which the values are illustrated in FIG. 2. This may be done by individual sensor or group of sensors, within sensor type, type of day, location, and/or time of day, as appropriate. This may be done, for example, by inputs from the remote/local client browser 30B. These values, as appropriate, may be established by a government agency such as the EPA, FDA, TSA or Department of Defense or otherwise suitably be provided by the client system 30E or otherwise by the client 30 in accordance with the client's needs. The upper and/or lower fluctuation buffers 108 and 106 respectively in FIG. 2 will be selected, by the client, to, for example, represent the expected variation in the sensing environment as wolf as published or otherwise accuracy specifications of the least accurate component in the sensor devices 14 or sub-sensor devices 15. The types of threats for which the present invention is usable are virtually endless and include any threat for which detection thereof indicated by a rise (or fall) in a condition is desired, such threats including, but not limited to, chemical, biological, radiological—nuclear, explosives, volatile organic compounds, toxins/disease in air, food, or water, or critical conditions such as unexpected water flow, excessive fuel or electrical demand and humidity, water, temperature, impact, open/closed, motion, location, vibration, contact, and light presence, and the list can go on and on.

The sensor and sub-sensor devices 14 and 15 are suitably calibrated during set-up and as otherwise required, i.e., determining and inputting what temperature equates to a certain current value for a particular sensor device or sub-sensor device.

In the present example, it is over the course of a day for a single temperature sensor, and the fluctuation buffer values are constant over the time period, although it should be understood that these values could be inputted in accordance with the present invention to vary over the time period. The client initially may form an estimate of what the baseline 114 should be, based on whatever data the client has. If the client has no previous data to go on, the client may, for example, enter a baseline of, for example, 70 degrees F. over the entire day, based on guess or even arbitrarily. An updated baseline as well as updated modified threshold values more closely reflecting the real baseline may be entered by the client 30B after some experience with what the data shows the temperatures are over the course of a day or other selected time interval, or the client may allow the CMU 26 (suitably programmed therefor) to develop these over time based on real data. Artificial intelligence software in the central monitoring unit 26 may be used to aid in developing these threshold values in conjunction with the running average baseline values.

During operation, the sensor device microprocessors 12 and sub-sensor device microprocessors 13 are programmed, in accordance with principles of common knowledge to those of ordinary skill in the art to which the present invention pertains, to receive values (sensor values) of the environmental threat being monitored by the respective sensor devices 14 (and their respective associated sub-sensor devices 15) and to determine and report, on a sensor-based check-in time line, to their respective detector unit 20, which relays the information to the central monitoring unit 26, all sensor values that fall within the allowable range, i.e., in the example of FIG. 2, between 102 and 104, using a normal sensor check-in timing (for example, readings in 5-minute intervals) and declaring, for example, a "green" low risk level (normal state 207), while sensor values that do not fall within that range are reported using an immediate check-in timing and declaring a "yellow" significant risk level (aware state 209), as illustrated by decision block 205. The CMU 26 operates and makes decisions, as illustrated at 203, in accordance with the block diagram 200, as discussed hereinafter.

If the CMU is programmed/inputted with a maximum allowable sensor value 107, which in the example of FIG. 2 is 100 degrees F. (or similarly with a minimum allowable sensor value 105 of 32 degrees F.), and with instructions to over-ride any decision to declare an aware state and to instead immediately declare an urgent alert 234, then a decision, illustrated at 222, in such an event would be made to override the declaration of an aware state, as illustrated at

216, and to instead declare an urgent alert 234. Thus, an urgent alert 234 would be declared at the temperature at 130 of, for example, 102 degrees F. even if the baseline temperature for that time were, for example, 94 degrees F. Of course, if the CMU were not so programmed, then the flow chart of FIG. 3 would not contain the decision block 222 or the decision 216 to override.

If there is no decision block 222 or if the decision is not to override when a sensor value is received that is outside the modified threshold range 102 to 104, the central monitoring unit 26 assesses whether there are other sensor devices 14 (and/or their sub-sensor devices 15) that have also reported sensor values that are outside the modified threshold range 102 to 104 and are located in the same physical area (by means of the programming of the central monitoring unit 26), as illustrated at 205, to determine whether a potential alert state, illustrated at 206, should be declared for a single sensor or sub-sensor or an area or Venue. The potential alert state may, for example, be classified as an "orange" high risk level or a "red" severe risk level (urgent potential alert state) depending on criteria developed by the client and programmed into the CMU 26. The microprocessors 12 and 13 are suitably programmed, in accordance with principles of common knowledge to those of ordinary skill in the art to which the present invention pertains, to send information to the applicable detector units 20 when the normal or aware heartbeat check-in timing, specified by the central monitoring unit 26, occurs or an inter-heartbeat assessment detects a sensor value that is outside the modified threshold range. However, as discussed hereinafter, the mere receipt of sensor values that are outside the modified threshold range, from various sensor devices 14 or sub-sensor devices 15 in an area or Venue, will not necessarily, in accordance with the present invention, cause a sensor or area alert 214 to be declared, as described hereinafter.

As illustrated at 204, after the initial setup and during normal operation, the CMU 26 receives from the detectors 20 the sensor readings and calculates and keeps the running average baseline 114, starting after initial setup (or subsequently inputted update) with the initially inputted or subsequently updated baseline, for each threshold sensor/sub-sensor (including each compound for a gas chromatograph sensor or each type of reading for a sensor providing more than one type of sensed condition) or group of threshold sensors/sub-sensors (if appropriate) over the time period (the calculation including all sensor readings).

Threshold sensor/sub-sensor devices 14A, 14B, 14P, and 15 are herein differentiated from condition sensor devices 14S which sense condition or on-off type information such as whether or not a door is open or closed or whether or not a motion sensor shows movement or whether or not an electrical circuit is enabled, with one of the two conditions being the normal or compliant state. As illustrated by decision block 235, before threshold sensor/sub-sensor information or values are inputted to the running average baseline 114, the CMU is programmed to determine whether the device under consideration is a condition sensor or a threshold sensor, as illustrated by decision block 235. If the device is not a condition sensor (in which case it is a threshold sensor/sub-sensor), the sensed reading is inputted to the running average 114. However, if the device is a condition sensor device 14S, then a decision is made, as illustrated by decision block 211, whether condition sensor 14S shows an alert condition (such as an electric circuit being enabled when it should not). If the condition sensor 14S does not show an alert condition, then a normal state is declared, as illustrated at 236. However, if the condition sensor 14S does show an alert condition, then a decision is made, as illustrated by decision block 213, whether an alert should be declared. The programming for the decision 213 utilizes a rules based process, i.e., a client-specified number of consecutive condition sensor readings indicating a potential alert 213 or other suitable client-specified criteria such as, for example, a counter such as of a specified number of non-compliant cycles/readings indicating a potential alert 213 for the particular condition sensor (as specified by the client) to determine whether the alert state 214 should be declared, as illustrated at 217. Thus, for subsequent cycles except the last one, a continued aware state is declared, as illustrated at 238, if the condition sensor reading again shows non-compliance. If an aware state is again declared on the last of the specified counter cycles for the particular condition sensor, then an alert 214 is declared. However, during any of these cycles, if an aware state is not declared, then the normal state 236 is declared. A subsequent cycle (i.e., resuming of sensing) would start after a period of time normally called a "re-arm time" (for example, 30 seconds), as specified by the client, who would also specify the number of aware state cycles for the particular condition sensor device before an alert is declared.

With respect to a sensor device which has been determined in decision block 235 to be a threshold sensor device, it is considered desirable that the running average baseline 114 take into account anomalies (such as an unexpected blast of really hot air) but with smoothing so that such anomalies do not cause an undue dynamic movement of the baseline. So as to provide the desired smoothing, such a running average baseline 114 is preferably calculated using what is known as large number numerology, which is defined, for purposes of this specification and the claims, as use of a large number (such as, for example, 100 for the temperature range in the example of FIG. 2) as a factor to adjust the running average baseline by only a small increment even though the sensor reading (blast of hot air) may be very large (anomaly). However, over a long period, the running average baseline will normally reflect the true sensor readings over the time period. If, for example, the running average baseline 114 shows a temperature of 70 degrees F. at a particular time and the actual sensor temperature at that particular time on a specific day is 75 degrees F., the new calculated running average baseline would not show a temperature of at or near 75 degrees F. for that particular time but would show a temperature closer to 70 degrees F. The new running average baseline may be calculated, using the large number numerology, using the following formula: $R=(NA-A+B)/N$ where R is the new or re-calculated running average baseline, N is the large number (such as, for example, 100 or other large number which provides the desired smoothing, the greater the number, the more smoothing there will be), A is the value of the sensor reading in the running average baseline before the re-calculation, and B is the new sensor reading. If, as above, the sensor temperature in the running average baseline is 70 degrees F. and the new sensor temperature is 75 degrees F., and the client has selected a smoothing large number of 100, then the new or re-calculated value R in the running average baseline would be $(100(70)-70+75)/100$ or 70.05 degrees F. However, as discussed above, if the temperature sensor reading shows a temperature of 75 degrees F. consistently every day for the particular time, the running average baseline 114 would gradually over time reflect that value or a value close to that value, but without the undesired dynamic fluctuations otherwise caused by anomalies. Thus, the running average baseline 114 for each sensor will seek or be moved, at each of multiple time points per hour, in the direction of the predominant sensed values, over time, at the respective time point, by day, type of day, time-of-day, or as otherwise appropriate, so that they will continue to be a stronger and stronger projector of the value that should be received from the respective sensor at the respective point in time.

Illustrated at 120 is a temperature sensor reading of 97 degrees F., which is over the upper modified threshold value 104 of 95 degrees F. As illustrated at 205, the CMU is programmed so that for each threshold sensor reading a decision is made whether to initiate an aware state, and if the sensor reading is below the upper modified threshold 104 (and of course above any lower modified threshold 102), the decision is to declare a normal state, as illustrated at 207. However, a threshold sensor reading greater than the upper modified threshold value 104 causes the CMV to place the particular threshold sensor device in what is called an aware state 209. This triggers (via decision block 205 if there is such a decision block) the decision block 206 (unless, as previously discussed, there is a decision 216 to override, as illustrated by decision block 222) wherein the CMU is programmed to decide whether the particular threshold sensor should remain in an aware state, illustrated at 208, or whether a potential alert state should be declared, illustrated at 206, which decision is made by a rules-based process. A "rules-based process" for either a condition sensor or a threshold sensor is defined, for the purposes of this specification and the claims, as a rule based on a client-specified number of consecutive sensor readings or other suitable client-specified criteria for determining when a potential alert state should be declared, as illustrated at 213 or 206 respectively. For example, the client may specify, in what may be called an "aware to alert state counter" in the CMU, for each sensor device, that a potential alert should be declared if the number of consecutive aware state readings received from a particular sensor device is, for example, 3 or more. If there have been 2 consecutive aware state readings received from the sensor device, the CMU would compare this number (2) to the number (3) called for by the aware to alert state counter for the declaration of a potential alert, thus determining that a potential alert should not be declared and that the particular sensor should be instead declared as being in the continued aware state. Otherwise, for example, if there have been 3 consecutive aware state readings, which is equal to or more than the number (3) called for by the aware to alert state counter for the declaration of a potential alert, the decision 206 is made to declare a potential alert. For a condition sensor, this decision would result in the declaration of an alert 214. However, for a threshold sensor, this decision will then be used to support a decision, made in the decision block 210, to declare an alert state, illustrated at 214, if such a decision is made as discussed hereinafter. Otherwise, the threshold sensor remains in a continued aware state, as illustrated at 212. When the rules-based process 206 or the decision block process 210 does not result in the declaration of an alert 214, the cycle of CMU operation 203 will result in a continued aware state declaration 208 or 212.

If the system 200 were set up so that the decision to declare an alert resulted from the above rules-based potential alert decision without further checking, as is generally in accordance with the prior art, it may undesirably result in too many false positives. In accordance with the present invention, many such false positives may be removed by making the decision called for by decision block 210 and discussed hereinafter, which may desirably result, if it is a false positive, in a continued aware state declaration, as illustrated at 212.

Referring to decision block 210, when a potential alert has been declared, a decision may be made not to declare an alert state when real-time sensor data values, for example, the temperature at 120 of 97 degrees F., is above the 95 degrees F. upper modified threshold 104 (or below the lower modified threshold 102), even though this data value appears to be in alert state. The making of such a decision 210 will now be described. In order to reduce false positives, when the running average baseline 114 shows the sensor readings (88 degrees F. at the time shown at 124) for the respective particular time to normally be greater than the upper threshold value 112, for the purposes of deciding, as illustrated at 210, whether a potential alert should be declared as an alert 214, the upper threshold 112 may be said to be temporarily increased, as illustrated at 122, so that the baseline buffer zone, illustrated at 132, is equal to the upper fluctuation buffer 108 so that false positives may be reduced. Thus, in what may be called an expert system, the buffer above the running average baseline 114 is temporarily increased to the span or amount of the expanded temporary upper threshold 122, which in the example is a buffer 132 of 10 degrees F. Thus, if the running average baseline temperature at time 124 is 88 degrees F., then the buffer is expanded to the expanded temporary upper threshold 122 so that an alert may not be declared until the temperature for that time exceeds 98 degrees F., such as illustrated at 128, i.e., a temperature of 99 degrees F. If the sensed value, such as at 128, does not fall within the temporarily expanded fluctuation buffer 132, the alert notification or declaration 214 proceeds, since it is considered that the associated false positive risk and false negative risk have then been satisfactorily mitigated. Of course, when the running average baseline 114 drops below upper buffer threshold 112, then the expanded temporary upper threshold 122 no longer applies whereby, in the example, a temperature over the 95 degrees F. upper modified threshold 104 would be a cause for declaring an alert 214.

When a sensor has been declared in an alert state 214, the client may consider the alert or normal states of other threshold-based sensors/sub-sensors in the Venue (many of which may be redundant) as part of its decision-making process on what action to be taken in view of the alert.

Return to normal state 207 after an aware or alert state occurs during a subsequent cycle when the sensor reading is within the normal threshold range, with the decision block 205 resulting in a normal state declaration 207. It should be noted that, for the threshold-based sensors, the fluctuation buffers play no role in returning the sensor to the normal state 207, although the running average baseline, if present, does. Once the normal state is declared, the fluctuation buffers are once more in play.

In addition to the sensed data received from the plurality of detectors 20 (and any optional intermediary Base Stations), on an exception basis, the central monitoring unit 26 is configured/programmed, as discussed hereinafter with respect to decision blocks 224 and 226, in accordance with principles of common knowledge to those of ordinary skill in the art to which the present invention pertains, to receive sensor data from the plurality of detectors 20 (and any optional intermediary Base Stations), on a predetermined check-in time schedule and/or a time schedule as required by the Department of Homeland Security, EPA, DOD, OSHA, the client 30, or others as appropriate, to ensure that all detectors 20 (and any optional intermediary Base Stations)

and their related sensor devices 14 (and any sub-sensor devices 15) have not been compromised, are active and able to detect threats, and that they are receiving complementary real-time data from all data points for their Venue. Otherwise, a failure of a detector 20 (or an optional intermediary Base Station) to respond to an expected event in a timely fashion will result in the central monitoring unit 26 communicating such information to the client's identified recipients 30A and/or 30C and/or 30D and optionally to their computer system 30E, over a secure virtual private network or secure SSL internet connection or the like, and keeping an ultra-secure, geographically dispersed, data log of the deficiency and confirming that a particular alert notification identified Venue (and/or a location within the Venue) is to be quarantined and inspected and the environmental threat is to be resolved and/or communication problem(s) between the central monitoring unit 26 and detectors 20 (and/or any optional intermediary Base Stations) and their sensor devices 14 (and any sub-sensor devices 15) are to be addressed and resolved.

Accordingly, the CMU operation 203 may also include, in sequence, determining whether a detector or a sensor (including both threshold and condition sensors) is not communicating, i.e., not checking in (for example, loss of battery or electrical power or stolen or ceased working, etc.), as illustrated by decision blocks 224 and 226 respectively. If the decision is "no" for each decision block 224 and 226, then an alert is not declared, as illustrated at 230. However, if one of the decision blocks 224 or 226 results in a "yes" decision (i.e., a detector or sensor device is not communicating), then an urgent alert is declared for the particular device, as illustrated at 232. There may of course be other decision blocks for other conditions resulting in the urgent (or other) alert declaration 232. The block diagram 200 could of course be differently constructed for determining whether or not to declare an alert 232 or 234. For example, each of the decision blocks 224 and 226 and any others may be placed directly under the CMU operating block 203 so that the decisions 224 and 226 and any others may be made in parallel rather than sequentially. For another example, the CMU 26 may be suitably programmed to check other conditions if an urgent alert 232 is declared. Such programming can be done by one of ordinary skill in the art to which the present invention pertains, using principles commonly known to one of ordinary skill in the art to which the present invention pertains.

When an area or individual sensor device alert notification is declared 214 within a Venue, the non-compliant threshold or condition sensor device value is desirably communicated immediately to the recipients 30A and/or 30C and/or 30D, as identified by the client, by the central monitoring unit 26, and also desirably to the client's computer system 30E. Urgent alerts 232 may be similarly transmitted that immediately identify, for example, detector units' non-communication, loss of electric power, loss of battery backup power, sensor device and/or sub-sensor device non-communication, low battery indicators, and low wireless signal strength indicators.

The central monitoring unit 26 is configured/programmed, in accordance with principles of common knowledge to those of ordinary skill in the art to which the present invention pertains, to receive data from several other sources including, as applicable and not limited to, the Venue content manifest and/or history from the client's computer system 30E, unique codes in RFID tags and/or other electronic identifiers, date and time stamped GPS co-ordinates, electronic thermometer, door status, and origination(s) of the Venue's contents so that, in real time, the central monitoring unit 26 can determine, from a profiling and other suitable perspectives, the Venues that have a greater likelihood of containing Threats, that are synonymous with an increased level of "risk" and requiring greater scrutiny than the normal Venue, which can then be targeted for special attention. The central monitoring unit 26 would desirably continue to monitor the Threats and provide Threat alerts 214, 232, and 234 on the schedule specified by the client (interval and duration) for the specific Venue until advised by the client's computer system 30E or otherwise by the client browser functionality that the Venue containing the Threat has been taken off-line for threat management, at which time appropriate messages may be sent to, for example, the Department of Homeland Security and other security and threat management agencies for their information and action as appropriate.

In addition to the data received from the plurality of detectors 20 (and any optional intermediary Base Stations), the central monitoring unit 26 is configured/programmed, in accordance with principles of common knowledge to those of ordinary skill in the art to which the present invention pertains, to receive data from the client's computer system 30E comprising additional data other than the data received from the detectors 20 and any optional intermediary Base Stations, such as, for example, Venue unique identification, shipper/shipper history and country/countries of origin and the shipping route/transit country/freight forwarder/consignee/owner of contents and destination log and a report of any field investigations and a manifest (all if an inspection building that can contain several shipping containers or other large objects that are subjected to sensor devices to accelerate the inspection process or other applicable controlled inspection area) plus GPS coordinate transit history, history of venue scanning, door status history, history of Venue weight and any incidents, and to asynchronously analyze this data in conjunction with the data received from the detectors 20 (and any intermediary Base Stations) to detect Threats in particular Venues, and, after such analysis has been completed in conjunction with considering the historic natural and/or artificially occurring and running average baseline data at the various specific locations within a Venue, by day, time of day, and type of day, should it be determined that the current sensor values are non-compliant with the normal state threshold range (102 to 104 in FIG. 2), a positive threat alert may be declared by the central monitoring unit, for the location(s) and/or area within the Venue, and it may be transmitted immediately to the client's identified recipients 30A and/or 30C and/or 30D and the clients' computer system 30E using, for example, a secure broadband Ethernet connection, cellular network, wireless computer network, WiFi system, or satellite link. The central monitoring unit 26 will reconfirm the threshold range or condition non-compliance when a Threat has been detected within a Venue, then mitigate the probability of a "false positive" and may increase the check-in heartbeat regularity (from, for example, 5-minute intervals to 1-minute intervals or even less) of the Venues' detectors 20 and sensors 16 and sub-sensors 17 as required to eliminate such occurrence, by utilizing the detection information received from the detectors 20 (and any optional intermediary Base Stations). When the information is confirmed by the central monitoring unit 26 and an alert 214 is declared (or an urgent alert 232 or 234 is declared), it will communicate such alert declaration 214 or urgent alert declaration 232 or 234 to the client's identified recipients 30A and/or 30C and/or 30D, and their computer system 30E over, for example, a secure virtual private network or secure Internet connection and provide the information received from various detectors 20 (via their related sensor devices/sub-sensor devices 14 and 15) including the GPS coordinates, cellular triangulation coordinates and other data points used to determine the non-compliance, as applicable, while keeping, for example, an ultra-secure log of the Venue and the Threat non-compliance event(s) in a secondary geographically dispersed location, and the central monitoring unit 26 may be programmed to advise the client computer system 30E to quarantine and inspect the identified non-compliant Venue(s) and resolve the Threat non-compliance event or other non-compliance in their Venue(s).

The following manual methods may be used for switching the transmissions of sensor data from one detector unit/gateway to another (such as, for example, switching the communications from sensor device 14A from detector unit 20A, as shown in FIG. 1, to another detector unit such as 20B) when one (such as detector unit 20A) has failed or been moved or for another reason. If a detector unit on a particular frequency (i.e., such as detector unit 20A on PAN=0x000000000000AAAA) has not failed, all or some of the sensor devices (as required by the client, at any time, for example, sensor device 14A) can be manually switched to another detector unit on another particular frequency (i.e., such as detector unit 20B on PAN=0x000000000000BBBB) using a secure administration function that resides upstream from the detector units (on the CMU 26 and accessed by user browser functionality or other suitable means). If a detector unit on a particular frequency (i.e., such as detector unit 20A on PAN=0x000000000000AAAA) has failed (which is considered rare in view of a 7-year life while in operation all the time) or has been moved, for example, to another distant user division, a spare or new detector unit may be deployed and set to the particular frequency of the detector unit/gateway being replaced (i.e., a replacement detector unit on PAN=0x000000000000AAAA for detector unit 20A), the CMU updates the new detector unit/gateway with its allowed sensors and their parameters, the sensors on that replacement detector unit/gateway will be allowed to join the network, and the coordinator software running on the replacement detector unit/gateway is suitably programmed, in accordance with principles commonly known to those of ordinary skill in the art to which the present invention pertains, to organize the optimized paths through the network, and these steps are manually taken.

In order to provide a more desirable automatic, non-manual, dynamic, fail-over/move-over process for moving all of the sensors (i.e., such as sensor device 14A on PAN=0x000000000000AAAA), such as those for a failed or moved detector unit (i.e., such as detector unit 20A on PAN=0x000000000000AAAA), to an alternate network detector unit (i.e., such as detector unit 20B on PAN=0x000000000000BBBB), the CMU, as well as detector units and sensor devices as necessary, is suitably programmed, in a manner that can be done by one of ordinary skill in the art to which the present invention pertains, having the knowledge contained within the present application and in accordance with principles commonly known to those of ordinary skill in the art to which the present invention pertains, to authorize the respective sensors within the alternate detector unit and on the particular alternate network path, with the alternate detector unit's coordinator (software) incorporating the respective sensors into the optimized paths.

If desired, the system 200 may be set up to allow the user to select between using the running average baseline 204 (line 241) and using thresholds 112 and/or 110 and modified thresholds 104 and/or 102, i.e., without a running average baseline 204 (line 239) for determining an aware state 205 and 211 respectively, as illustrated at 237. A problem with sensing devices is that they could bounce alternately above and below a threshold temperature or other value thereby alternately going in and out of an aware state. In order to resolve this problem, some conventional sensing devices may be set to stay in an aware state once they are in an aware state, and neither is this a good solution. With the line 239 selection, there is still an upper modified threshold 104 at which temperature or sensed point an aware state is declared, as at 211. That aware state 211 remains until the temperature or other point reaches the upper threshold 112 at which point the sensing device is re-set to a normal state 236, thereby allowing smoothing of the aware/normal state, which is controlled by the amount of the buffer 108. The same may of course also be said for the lower threshold 110 and lower modified threshold 102.

The programming required for the system 10 and illustrated in FIG. 3 can be done by one of ordinary skill in the art to which the present invention pertains, using principles commonly known to one of ordinary skill in the art to which the present invention pertains.

Thus, in accordance with the present invention, the upper modified threshold values 104 are set as high as desired by the client to guard against false negatives by selecting upper fluctuation buffers 108 to achieve that goal while the CMU 26 deploys the expanded temporary upper threshold 122 to adequately mitigate the probability of false positives, whereby to provide a more reliable system in which the client can have greater confidence.

It should be understood that, while the present invention has been described in detail herein, the invention can be embodied otherwise without departing from the principles thereof, and such other embodiments are meant to come within the scope of the present invention as defined by the claims.

What is claimed is:

1. A data sensing and environmental threat detecting network for detecting and reporting environmental threats within a venue, the network comprising a plurality of wireless detector units each having a transmitter and a receiver for respectively transmitting and receiving environmental and location coordinates data information within the venue and each having a data processor, the network further comprising a plurality of wireless sensor devices each having a transmitter and a receiver for respectively transmitting and receiving environmental and location coordinates data information within the venue and each having a data processor, said detector units and said sensor devices being in a multi-hop, WiFi or cellular network arrangement whereby said detector unit data processors and said sensor device data processors have programming which allows communication alternately to and from more than one of others of said detector units and said sensor devices in a manner such that transmission of data from said sensor devices to said detector units and communication from said detector units to said sensor devices may be effected over alternate wireless paths whereby the transmission of data from said sensor devices to said detector units and communication from said detector units to said sensor devices may be effected using optimized wireless paths, the network further comprising means for blanketing substantially all of physical space in the venue with low-cost devices for sensing environmental and location coordinates data in a quantity of said low-cost devices so that substantially all of physical space in the venue can be sampled inexpensively, said means for blanketing comprising a plurality of environmental and location coordinates data sub-sensor devices equipped with low power wireless communications technology and each having a transmitter and a receiver for respectively transmitting and receiving information and each having a processor whereby the distance over which said sub-sensor devices are equipped to wirelessly transmit data is limited by the low power wireless communications technology thereof, said sub-sensor processor programmed for communication with an associated one of said sensor devices which is sufficiently nearby to receive data transmitted from said respective low power wireless communications technology sub-sensor device, and wherein said sensor devices are equipped to communicate with said detector units and with others of said sensor devices over distances which are greater than the limited distance over which said sub-sensor devices are equipped to communicate, the network further comprising a central monitoring unit which is programmed to communicate to and from said detector units for management of routing of transmissions of environmental and location coordinates data between said sensor devices and said detector units over optimized paths and for comparing the environmental and location coordinates data received from said sensor devices and said sub-sensor devices within the venue to determine whether an environmental threat exists within the venue, wherein said detector units are equipped to receive and process sensed and location coordinates information from said sensor devices and transmit the processed sensed and location coordinates information to said central monitoring unit, and wherein the network has first programming to provide a plurality of running average baselines of at least one sensed value of at least one of said sensor and sub-sensor devices, and second programming to declare a potential alert when a sensed value of said at least one of said sensor and sub-sensor devices is at a value which is either (1) greater than a corresponding predetermined upper threshold value or a corresponding running average baseline value (whichever is greater) plus a corresponding predetermined upper fluctuation buffer value, or (2) less than a corresponding predetermined lower threshold value or a corresponding running average baseline value (whichever is less) less a corresponding predetermined lower fluctuation buffer value, and third programming to declare an alert when a sensed value of said sensor or sub-sensor devices, relative to its prior sensed value, is at a differential value greater than its allowed corresponding predetermined upper rate of change threshold over a predetermined period of time or is at a differential value less than its allowed corresponding predetermined lower rate of change threshold over a predetermined period of time, and fourth programming to declare an alert when the location coordinates of a said detector unit or said sensor device or said sub-sensor device is at a differential value which is greater than the allowed corresponding predetermined Global Positioning System and/or Cellular Triangulation Tracking System, differential threshold, and fifth programming after an alert has been declared, to enable a wireless sensor device to power relational devices, consisting of any or all of the following, water/liquid pumps, security beacons, video surveillance systems, audio surveillance systems, lighting systems and audio response systems, and confirm that the relational device(s) has/have been enabled.

2. The network according to claim 1 wherein at least one of said sensor devices and sub-sensor devices is modular.

3. The network according to claim 1 wherein the network has programming for comparing values of said sensor devices and sub-sensor devices with predetermined threshold values in a manner to minimize false positive values of said sensor and sub-sensor devices while minimizing introduction of false negative values of said sensor devices and sub-sensor devices in deciding whether an alert should be declared.

4. The network according to claim 1 wherein the network has sixth programming to determine to alert when a predetermined maximum or minimum allowable sensed value is reached.

5. The network according to claim 1 wherein the network has programming to declare an alert when one of said wireless detector units fails to communicate with said central monitoring unit within a predetermined time period or when one of said wireless sensor devices fails to communicate with said respective wireless detector unit within a predetermined time period or when one of said wireless sub-sensor devices fails to communicate with said respective wireless sensor device within a predetermined time period or when one of said wireless detector units fails to communicate its location coordinates to said central monitoring unit within a predetermined time period or when one of said wireless sensor devices fails to communicate its location coordinates to said respective wireless detector unit within a predetermined time period or when one of said wireless sub-sensor devices fails to communicate its location coordinates to said respective wireless sensor device within a predetermined time period.

6. A data sensing and environmental threat detecting network for detecting and reporting environmental threats within a venue, the network comprising a plurality of wireless detector units each having a transmitter and a receiver for respectively transmitting and receiving environmental data information within the venue and each having a data processor, the network further comprising a plurality of sensor devices including at least one portable sensor device each of which sensor devices having a transmitter and a receiver for respectively transmitting and receiving environmental data information within the venue and each of which sensor devices having a data processor, said detector units and said sensor devices being in a multi-hop, WiFi or Cellular network arrangement whereby said detector unit data processors and said sensor device data processors have programming which allows communication alternately to and from more than one of others of said detector units and said sensor devices in a manner such that transmission of data from said sensor devices to said detector units and communication from said detector units to said sensor devices may be effected over alternate wireless paths whereby the transmission of data from said sensor devices to said detector units and communication from said detector units to said sensor devices may be effected using optimized wireless paths, the network further comprising means for blanketing substantially all of physical space in the venue with low-cost devices for sensing environmental data in a quantity of said low-cost devices so that substantially all of physical space in the venue can be sampled inexpensively, said means for blanketing comprising a plurality of environmental data sub-sensor devices equipped with low power wireless communications technology and each having a transmitter and a receiver for respectively transmitting and receiving information and each having a processor whereby the distance over which said sub-sensor devices are equipped to wirelessly transmit data is limited by the low power wireless communications technology thereof, said sub-sensor processor programmed for communication with an associated one of said sensor devices which is sufficiently nearby to wirelessly receive data transmitted from said respective low power wireless communications technology sub-sensor device, and wherein said sensor devices are equipped to communicate with said detector units and with others of said sensor devices over distances which are greater than the limited distance over which said sub-sensor devices are equipped to communicate, the network further comprising a central monitoring unit which is programmed to communicate to and from said detector units for management of routing of transmissions of environmental data between said sensor devices and said detector units over optimized paths and for comparing the environmental data received from said sensor devices and said sub-sensor devices within the venue to determine whether an environmental threat exists within the venue, wherein said detector units are equipped to receive and process sensed information from said sensor devices and transmit the processed sensed information to said central monitoring unit, and wherein the network has first programming to provide a plurality of running average baselines of at least one sensed value of at least one of said sensor and sub-sensor devices, and second programming to declare a potential alert when a sensed value of said at least one of said sensor and sub-sensor devices is at a value which is either (1) greater than a corresponding predetermined upper threshold value or a corresponding running average baseline value (whichever is greater) plus a corresponding predetermined upper fluctuation buffer value, or (2) less than a corresponding predetermined lower threshold value or a corresponding running average baseline value (whichever is less) less a corresponding predetermined lower fluctuation buffer value.

7. The network according to claim 6 wherein said portable sensor device has a size which is less than about 8 inches by 8 inches by 8 inches.

8. The network according to claim 6 wherein said portable sensor device includes means for communicating with an associated detector unit via a multi-hop, WiFi or Cellular network arrangement.

9. The network according to claim 6 wherein at least one of said sensor devices and sub-sensor devices is modular.

10. The network according to claim 6 wherein the network has programming for comparing values of said sensor devices and sub-sensor devices with predetermined threshold values in a manner to minimize false positive values of said sensor and sub-sensor devices while minimizing introduction of false negative values of said sensor devices and sub-sensor devices in deciding whether an alert should be declared.

11. The network according to claim 6 wherein the network has programming to declare an alert when one of said wireless detector units fails to communicate with said central monitoring unit within a predetermined time period or when one of said wireless sensor devices fails to communicate with said respective wireless detector unit within a predetermined time period.

12. The network according to claim 6 wherein the network has third programming to determine to alert when a predetermined maximum or minimum allowable sensed value is reached.

13. A data sensing and environmental threat detecting network for detecting and reporting environmental threats within a venue, the network comprising a plurality of wireless detector units each having a transmitter and a receiver for respectively transmitting and receiving environmental and location coordinates data information within the venue and each having a data processor, the network further comprising a plurality of sensor devices each of which sensor devices having a transmitter and a receiver for respectively transmitting and receiving environmental data information within the venue and each of which sensor devices having a data processor, said detector units and said sensor devices being in a multi-hop, WiFi or Cellular network arrangement whereby said detector unit data processors and said sensor device data processors have programming which allows communication alternately to and from more than one of others of said detector units and said sensor devices in a manner such that transmission of data from said sensor devices to said detector units and communication from said detector units to said sensor devices may be effected over alternate wireless paths whereby the transmission of data from said sensor devices to said detector units and communication from said detector units to said sensor devices may be effected using optimized wireless paths, the network further comprising means for blanketing substantially all of physical space in the venue with low-cost devices for sensing environmental and location coordinates data in a quantity of said low-cost devices so that substantially all of physical space in the venue can be sampled inexpensively, said means for blanketing comprising a plurality of environmental and location coordinates data sub-sensor devices equipped with low power wireless communications technology and each having a transmitter and a receiver for respectively transmitting and receiving information and each having a processor whereby the distance over which said sub-sensor devices are equipped to wirelessly transmit data is limited by the low power wireless communications technology thereof, said sub-sensor processor programmed for communication with an associated one of said sensor devices which is sufficiently nearby to wirelessly receive data transmitted from said respective low power wireless communications technology sub-sensor device, and wherein said sensor devices are equipped to communicate with said detector units and with others of said sensor devices over distances which are greater than the limited distance over which said sub-sensor devices are equipped to communicate, the network further comprising a central monitoring unit which is programmed to communicate to and from said detector units for management of routing of transmissions of environmental and location coordinates data between said sensor devices and said detector units over optimized paths and for comparing the environmental and location coordinates data between said sensor devices and said sub-sensor devices within the venue to determine whether an environmental threat exists within the venue, wherein said detector units are equipped to receive and process sensed and location coordinates information from said sensor devices and transmit the processed sensed and location coordinates information to said central monitoring unit, and wherein said sensor and sub-sensor devices include at least one wireless condition sensing device, and wherein the network has programming to (a) declare an aware state when a non-compliant condition is sensed by said wireless condition sensing device and (b) after an aware state of the sensed condition has been declared by said wireless condition sensing device, to declare an alert after a predetermined number of cycles of the condition being sensed or to declare a normal state if the condition is not sensed during one of the predetermined number of cycles.

14. The network according to claim 13 wherein the network has programming to declare an alert when one of said wireless detector units fails to communicate with said central monitoring unit within a predetermined time period or when one of said wireless sensor devices fails to communicate with said respective wireless detector unit within a predetermined time period or when one of said wireless sub-sensors devices fails to communicate with said respective wireless sensor device within a predetermined time period or when one of said wireless detector units fails to communicate its location coordinates to said central monitoring unit within a predetermined time period or when one of said wireless sensor devices fails to communicate its location coordinates to said respective wireless detector unit within a predetermined time period or when one of said wireless sub-sensor devices fails to communicate its location coordinates to said respective wireless sensor device within a predetermined time period.

15. The network according to claim 13 wherein at least one of said sensor devices and sub-sensor devices is modular.

16. The network according to claim 13 wherein the network has programming for comparing values of said sensor devices and sub-sensor devices with predetermined threshold values in a manner to minimize false positive values of said sensor and sub-sensor devices while minimizing introduction of false negative values of said sensor devices and sub-sensor devices in deciding whether an alert should be declared.

17. The network according to claim 13 wherein the network has first programming to provide a plurality of running average baselines of at least one sensed value of at least one of said sensor and sub-sensor devices, and second programming to declare a potential alert when a sensed value of said at least one of said sensor and sub-sensor devices is at a value which is either (i) greater than a corresponding predetermined upper threshold value or a corresponding running average baseline value (whichever is greater) plus a corresponding predetermined upper fluctuation buffer value, or (ii) less than a corresponding predetermined lower threshold value or a corresponding running average baseline value (whichever is less) less a corresponding predetermined lower fluctuation buffer value, and third programming to declare an alert when a sensed value of said sensor or sub-sensor devices, relative to its prior sensed value, is at a differential value greater than its allowed corresponding predetermined upper rate of change threshold over a predetermined period of time or is at a differential value less than its allowed corresponding predetermined lower rate of change threshold over a predetermined period of time, and fourth programming to declare an alert when the location coordinates of a said detector unit or said sensor device or said sub-sensor device is at a differential value which is greater than the allowed corresponding predetermined Global Positioning System and/or Cellular Triangulation Tracking System, differential threshold, and fifth programming after an alert has been declared, to enable a wireless sensor device to power relational devices, consisting of any or all of the following, water/liquid pumps, security beacons, video surveillance systems, audio surveillance systems, lighting systems and audio response systems, and confirm that the relational device(s) has/have been enabled.

18. The network according to claim 13 wherein the network has first programming to declare a potential alert when a sensed value of said at least one of said sensor and sub-sensor devices is at a value which is either (1) greater than a corresponding predetermined upper threshold value plus a corresponding predetermined upper fluctuation buffer value, or (2) less than a corresponding predetermined lower threshold value less a corresponding predetermined lower fluctuation buffer value, and second programming to declare an alert when a sensed value of said sensor or sub-sensor devices, relative to its prior sensed value, is at a differential value greater than its allowed corresponding predetermined upper rate of change threshold over a predetermined period of time or is at a differential value less than its allowed corresponding predetermined lower rate of change threshold over a predetermined period of time, and third programming to declare an alert when the location coordinates of a said detector unit or said sensor device or said sub-sensor device is at a differential value which is greater than the allowed corresponding predetermined Global Positioning System and/or Cellular Triangulation System, differential threshold, and fourth programming after an alert has been declared, to enable a wireless sensor device to power relational devices, consisting of any or all of the following, water/liquid pumps, security beacons, video surveillance systems, audio surveillance systems, lighting systems and audio response systems, and confirm that the relational device(s) has/have been enabled.

19. The network according to claim 13 wherein the network has programming to determine to alert when a predetermined maximum or minimum allowable sensed value is reached.

20. A network according to claim 13 wherein said portable sensor device has a size which is less than about 8 inches by 8 inches by 8 inches.

\* \* \* \* \*